US012729510B2

(12) United States Patent
Yamaguchi et al.

(10) Patent No.: US 12,729,510 B2
(45) Date of Patent: Sep. 8, 2026

(54) REMOTE CONTROL SYSTEM, REMOTE-OPERATED WORK MACHINE SYSTEM, AND WORK INFORMATION DISPLAY CONTROL METHOD

(71) Applicant: HITACHI CONSTRUCTION MACHINERY CO., LTD., Tokyo (JP)

(72) Inventors: Keita Yamaguchi, Tokyo (JP); Yusuke Nakamura, Tokyo (JP); Ichiro Kawamura, Tokyo (JP); Junichi Kuwata, Tokyo (JP); Hideaki Ito, Tsuchiura (JP); Hidefumi Ishimoto, Tsuchiura (JP); Kei Satou, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 100 days.

(21) Appl. No.: 18/867,630

(22) PCT Filed: May 22, 2023

(86) PCT No.: PCT/JP2023/018918
§ 371 (c)(1),
(2) Date: Nov. 20, 2024

(87) PCT Pub. No.: WO2023/228897
PCT Pub. Date: Nov. 30, 2023

(65) Prior Publication Data

US 2026/0193864 A1 Jul. 9, 2026

(30) Foreign Application Priority Data

May 23, 2022 (JP) ................................ 2022-084000

(51) Int. Cl.
*E02F 9/20* (2006.01)
*E02F 9/26* (2006.01)
(Continued)

(52) U.S. Cl.
CPC .............. *E02F 9/205* (2013.01); *E02F 9/261* (2013.01); *G06V 20/20* (2022.01); *G06V 20/56* (2022.01)

(58) Field of Classification Search
CPC .......... E02F 9/205; E02F 9/261; G06V 20/20; G06V 20/56
See application file for complete search history.

(56) References Cited

U.S. PATENT DOCUMENTS 12,352,009 B2 * 7/2025 Hama .................... G08C 17/00
2006/0041845 A1 * 2/2006 Ferguson ................ G06F 9/451
715/751

(Continued)

FOREIGN PATENT DOCUMENTS

JP 6824856 B2 2/2021
KR 10-2021-0125516 A 10/2021

OTHER PUBLICATIONS

International Search Report of PCT/JP2023/018918 dated Jun. 20, 2023.

*Primary Examiner* — Gertrude Arthur Jeanglaude
(74) *Attorney, Agent, or Firm* — MATTINGLY & MALUR, PC

(57) ABSTRACT

To prevent a reduction of the work efficiency caused by video disturbance due to a video transmission delay and a communication packet loss during communication and to improve the work efficiency for the operator in a series of operations of a remotely operated work machine, the present disclosure proposes a remote control system that remotely controls a work machine. The remote control system includes a communication device that communicates with the work machine, and a control device that controls the operation of the work machine and processes and displays a surroundings video from the work machine on a display device. The communication device receives the surround-
(Continued)

ings video captured in the work machine and assistance information including attitude information of the work machine and three-dimensional information around the work machine. The control device executes: a process for generating an assistance figure indicating an attitude of the work machine and a position for work from the assistance information; and a process for displaying on the display device in a superimposed manner, the surroundings video acquired at a first timing in the work machine, and the assistance figure generated from the assistance information acquired at a second timing later than the first timing in the work machine (see FIG. 10).

15 Claims, 27 Drawing Sheets

(51) Int. Cl.
*G06V 20/20* (2022.01)
*G06V 20/56* (2022.01)

(56) References Cited

U.S. PATENT DOCUMENTS

2020/0125114 A1 4/2020 Minagawa et al.
2022/0170243 A1 6/2022 Roh et al.
2023/0315087 A1* 10/2023 Suzuki .................. B60K 35/10
2025/0034841 A1* 1/2025 Aizawa .................. E02F 9/205
2025/0146254 A1* 5/2025 Aizawa .................... E02F 9/20

* cited by examiner

Attitude in acquiring video 1 and assistance information 1

Attitude in acquiring video 2 and assistance information 2

REMOTE CONTROL SYSTEM, REMOTE-OPERATED WORK MACHINE SYSTEM, AND WORK INFORMATION DISPLAY CONTROL METHOD

TECHNICAL FIELD

The present disclosure relates to a remote control system, a remote-operated work machine system, and a work information display control method.

BACKGROUND ART

A work machine control system in which a work machine can be remotely operated is in practical use. However, the work efficiency may be reduced due to a transmission delay that occurs by transmission of a video from the work machine to the remote control system (remote operation room). To cope with this, for example, Patent Literature 1 proposes to process the video so as to correct the delay time associated with transmission of the video for the work in a remote operation section and display the processed video on a display. Displaying such processed video can improve the remote operation efficiency when there is a large receipt delay time of the video in the remote operation room in which remote operation is performed.

CITATION LIST

Patent Literature

Patent Literature 1: JP 6824856 B

SUMMARY OF INVENTION

Technical Problem

According to Patent Literature 1, the transmission delay of the surroundings video of the work machine (host vehicle) is improved. However, since the host vehicle is not presumed to appear in the video, when the host vehicle partially appears in the video, the display position of the portion of the host vehicle in the processed video may be displaced in relation to the image of the surroundings, which may impair the efficient operation by an operator. In addition, any video disturbance due to a communication packet loss during communication may also impair the efficient operation.

In view of such circumstances, the present disclosure provides techniques that make it possible to prevent a reduction of the work efficiency caused by video disturbance due to a video transmission delay and a communication packet loss during communication and to improve the work efficiency for the operator in a series of operations of a remotely operated work machine.

Solution to Problem

In order to solve the problem, the present disclosure proposes a remote control system that remotely controls a work machine. The remote control system includes a communication device that communicates with the work machine, and a control device that controls the operation of the work machine and processes and displays a surroundings video from the work machine on a display device. The communication device receives the surroundings video captured in the work machine and assistance information including attitude information of the work machine and three-dimensional information around the work machine. The control device executes: a process for generating an assistance figure indicating an attitude of the work machine and a position for work from the assistance information; and a process for displaying on the display device in a superimposed manner, the surroundings video acquired at a first timing in the work machine, and the assistance figure generated from the assistance information acquired at a second timing later than the first timing in the work machine.

Further features relating to the present disclosure will become apparent from the following descriptions and the attached drawings. Aspects of the present disclosure may be achieved or implemented by various elements and various combinations of such elements, as well as by the following detailed descriptions and the claims that follow.

It should be understood that the descriptions that follow are for exemplary purposes only, and do not in any way represent a limitation of the scope of the claims or application examples of the present disclosure.

Advantageous Effects of Invention

According to the techniques of the present disclosure, during a series of operations of a remotely operated work machine, a reduction of the work efficiency caused by a video transmission delay can be prevented.

DESCRIPTION OF EMBODIMENTS

In the following, embodiments will be described with reference to the attached drawings. In the attached drawings, functionally identical elements may be indicated by identical numerals. While the attached drawings show embodiments and implementation examples in accordance with the principles of the present disclosure, these are for the purpose of understanding the present disclosure and should not be used for interpreting the present disclosure in a limited sense. The descriptions herein are provided merely by way of examples, and are not intended to be limiting of the scope of the claims or application examples of the present disclosure in any sense.

While the embodiments are described in sufficient detail to enable a person skilled in the art to practice the present disclosure, it is to be understood that other implementations or modes are possible, and that changes in configuration or structure as well as substitution of various elements may be made without departing from the scope of the technical concepts and spirit of the present disclosure. Accordingly, the following description is not to be interpreted in a limited sense.

(1) First Embodiment

<Configuration Example of Work Machine Control System>

Figure 1:
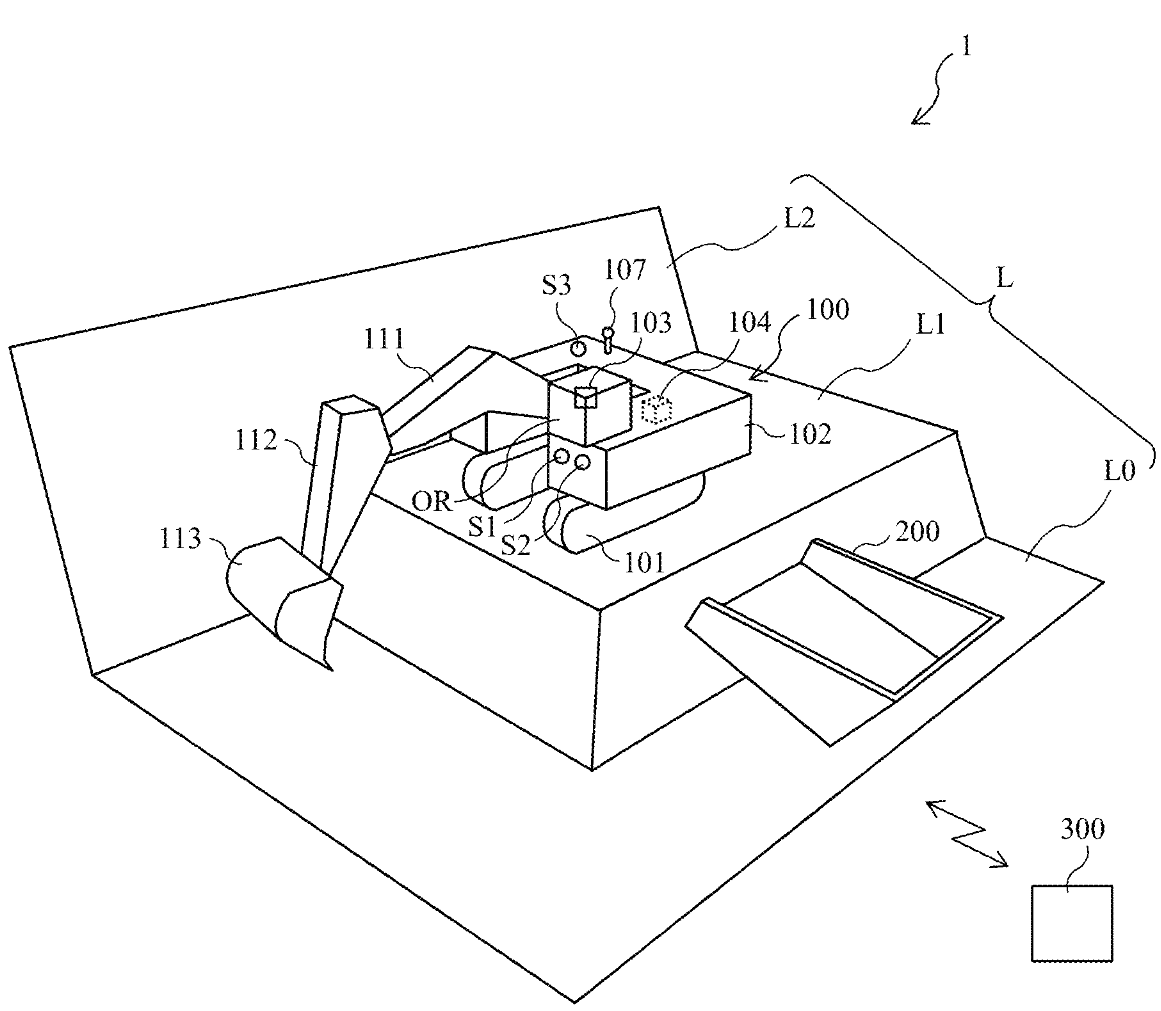
FIG. 1 is a diagram illustrating an external configuration example of a work machine control system 1.
Figure 2:
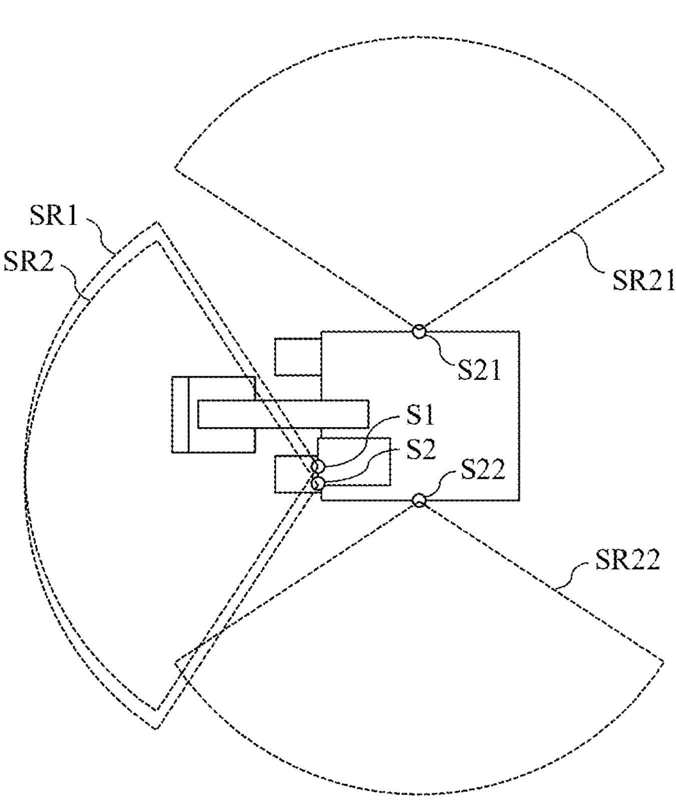
FIG. 2 is a schematic diagram illustrating a configuration of a surroundings video acquisition section S1 and a three-dimensional information acquisition section S2, which are mounted on a work machine 100.
Figure 3:
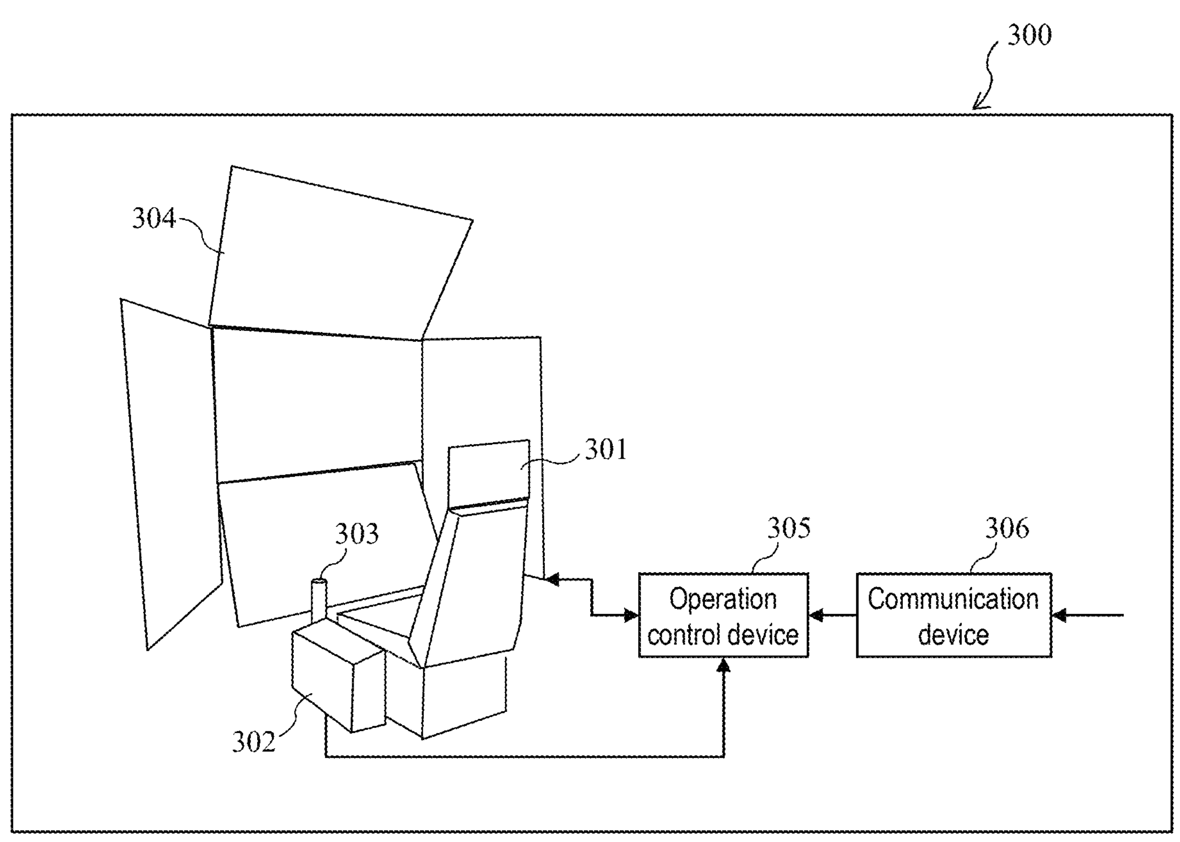
FIG. 3 is a diagram illustrating an internal configuration example of a remote control system (operation room) 300.

With reference to FIG. 1 to FIG. 3, a schematic configuration example of a work machine control system (remote-operated work machine system) 1 according to a first embodiment will be described. FIG. 1 is a diagram illustrating an external configuration example of the work machine control system 1. FIG. 2 is a schematic diagram illustrating a configuration of a surroundings video acquisition section S1 and a three-dimensional information acquisition section S2, which are mounted on a work machine 100. FIG. 3 is a diagram illustrating an internal configuration example of a remote control system (operation room) 300.

As illustrated in FIG. 1, the work machine control system 1 includes the remote control system 300 and the work machine (construction machine) 100 controlled by the remote control system 300.

The work machine 100 for example is a backhoe in which a bucket 113 faces an operation room OR. Through the operation of the work machine 100, a ground L that is a construction target is excavated, forming a flat surface L0, a flat surface L1, and an inclined surface L2, for example. The earth excavated by the work machine 100 is discharged (dumped) into a vessel 200, such as a dump truck, by the work machine 100 rotating and moving the bucket 113 to the vessel 200.

The work machine 100 that is a backhoe includes, for example: a crawler 101; a body section 102 supported and carried by the crawler 101; an operation room OR mounted on the body section 102; a sensor information processing section 103; a communication device 104; various sensors S1 to S4; an antenna 107; a boom 111; an arm 112; and a bucket 113. The boom 111, the arm 112, and the bucket 113 are driven by an engine, a hydraulic cylinder, and the like, which are not shown, to perform excavation on the ground L, which is a construction target.

The crawler 101 is driven by a drive section, not shown, so that the body section 102 can be moved forward, backward, left, and right. The body section 102 is configured to be able to rotate with respect to the crawler 101, and is driven by a drive section, not shown, to have the rotation direction and rotation angle thereof controlled. The work machine 100 is configured to be operable unattended and remotely controllable by the remote control system 300. Thus, the operator need not be in the operation room OR.

The body section 102 has (mounted thereon) a sensor information processing section 103 and a communication device 104. The sensor information processing section 103 compresses a video of a ground that is a construction target and the bucket 113 (a video in which an area including the work machine 100 and its surroundings, which is a work area of the work machine 100, is captured; hereinafter this may also be referred to as the surroundings video), acquired by the surroundings video acquisition section S1 including an imaging element. In addition, the sensor information processing section 103 generates assistance information including position information (information about a distance from a reference point) of the current bucket 113, the work ground surface located immediately below the bucket 113, and the vessel 200 such as a dump truck, and the like on the basis of sensor information obtained from the three-dimensional information acquisition section S2 and an attitude information acquisition section S3. The assistance information may be configured by sensor information itself obtained from the three-dimensional information acquisition section S2 and the attitude information acquisition section S3, or may be configured by information obtained by converting the sensor information to a body section coordinate system (machine body coordinate system) of the work machine 100. However, the latter information is preferred taking into account the computation amount in the subsequent processes.

The communication device 104 is configured to transmit acquired video data and assistance information to the remote control system 300, and is configured to receive control information from the remote control system 300.

The body section 102 is provided with, at predetermined locations, the surroundings video acquisition section S1 for acquiring a video of the front section (the boom 111, the arm 112, the bucket 113) of the work machine 100 and a surroundings video, the three-dimensional information acquisition section S2 for sensing the presence or absence of an object in a field of view and the distance thereto, and the attitude information acquisition section S3 for sensing the attitude of the work machine 100. As illustrated in FIG. 2, as an example, the surroundings video acquisition section S1 is an imaging device that captures the surroundings of the work machine 100, for example, a camera having a CMOS sensor or the like for imaging a field of view SR1 ahead of the work machine 100.

The three-dimensional information acquisition section S2 is an object detection sensor, such as LiDAR (Light Detection and Ranging) or an ultrasonic sensor, for sensing the presence or absence of an object in a field of view SR2 and the distance thereto. The three-dimensional information acquisition section S2 measures the distance by means of a sensor S2 as sensor information, but outputs three-dimensional information obtained by converting the measured distance to information in the body section coordinate system. The three-dimensional information acquisition section S2 is not limited thereto, and may be composed of a plurality of LiDARs or ultrasonic sensors, such as a sensor S21 for sensing a field of view SR21, a sensor S22 for sensing a field of view SR22, and the like. The fields of view are not limited to the three directions. The position, angle, and/or the number of the sensors installed may be adjusted in accordance with the angle of view of the sensors so as to sense the entire circumference. In addition, the surroundings video acquisition section S1 and the three-dimensional information acquisition section S2 may be each configured as a single camera or plural stereo cameras capable of imaging and stereoscopy.

The attitude information acquisition section S3 is an attitude sensor for sensing the attitude of the work machine 100, and can acquire the attitudes of the boom 111, the arm 112, and the bucket 113 (for example, the angle between the boom 111 and the body section 102, the angle of the arm 112 from the coupling portion, and the angle of the bucket 113 from the coupling portion) and the rotation angle of the body section 102 with respect to crawler 101 (the angle may be set to zero when the crawler 101 and the body section 102 are facing the same direction). The attitude information acquisition section S3 may be composed of, for example, any of a gyro sensor, a tilt sensor, and an acceleration sensor, or a combination thereof. What is illustrated in FIG. 2 is exemplary, and is not limiting of the present disclosure.

With reference to FIG. 3, an example of the details of the configuration of the remote control system 300 is described. The remote control system 300, as an example, is provided with a driver's seat 301, an operation control section 302, an operating column 303, a display 304, an operation control device 305, and a communication device 306.

The driver's seat 301 is a chair on which the operator sits, with the operation control section 302 and the operating column 303 disposed to the side. Other than the operating column 303, various levers, switches, pedals and the like may be arranged, and their operations may be reflected on the operation of the work machine 100. As the operating column 303 and the like are operated, corresponding operation signals are generated in the operation control section 302 and are transmitted to the operation control device 305. In accordance with the received operation signals, the operation control device 305 generates control signals for driving the work machine 100, and transmits the control signals to the work machine 100 through the communication device 306.

The display 304 is a display section that is disposed forwardly of the driver's seat 301 to display a superimposed video including the bucket 113, the ground as the construction target, and an AR (Augmented Reality) image which will be described later. The display 304, as illustrated in FIG. 3, may be configured including a plurality of display devices having appropriate angles of depression such that a 3-dimensional space can be expressed realistically. The display 304 is not limited to such configuration and may be composed of a single display device, or may be a head-mounted display.

<Internal configuration example of sensor information processing section 103>

Figure 4:
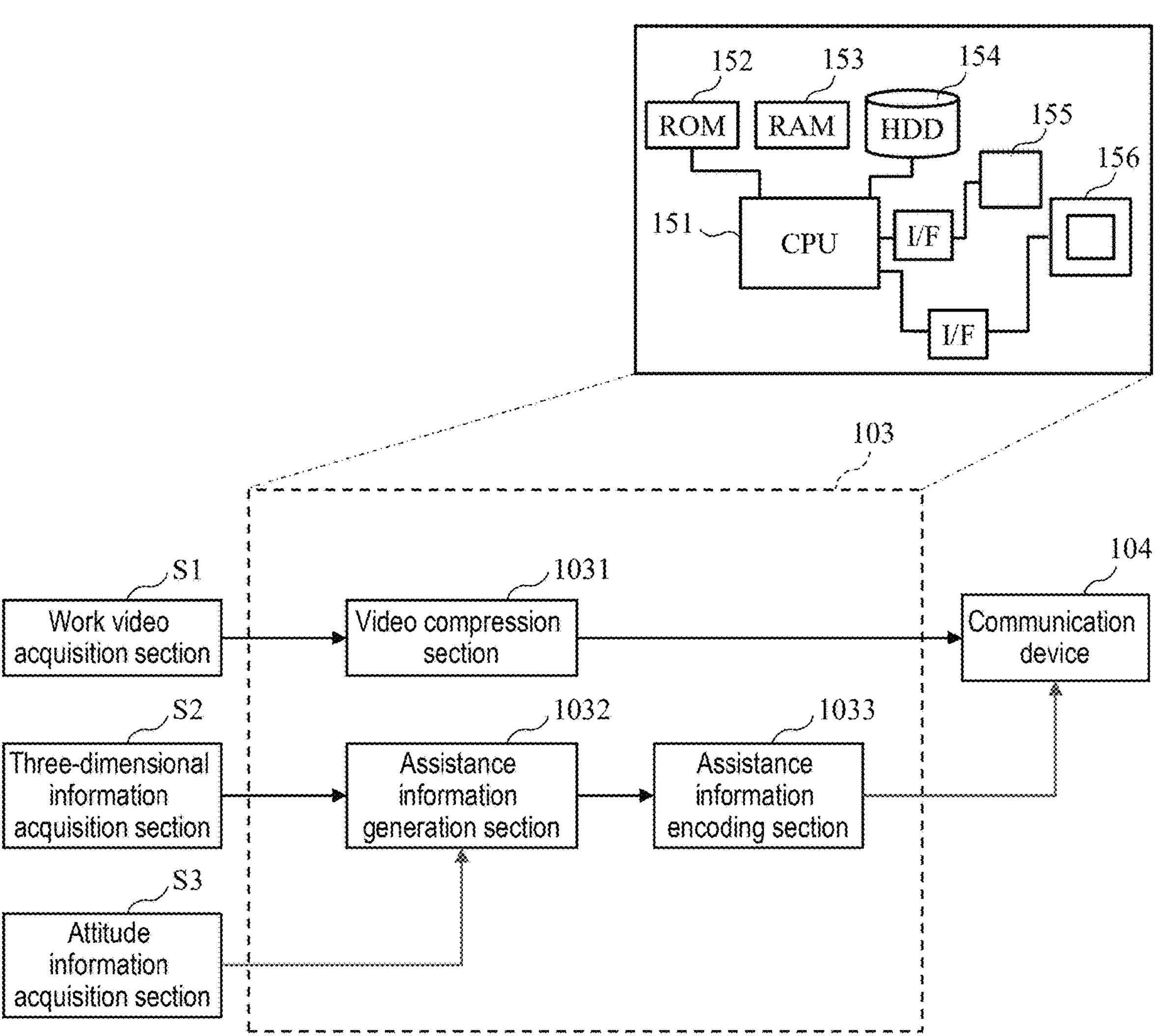
FIG. 4 is a diagram illustrating an internal configuration example of a sensor information processing section 103 mounted on the work machine 100.

FIG. 4 is a diagram illustrating an internal configuration example of the sensor information processing section 103 mounted on the work machine 100.

The sensor information processing section 103 is provided with, as an example, a video compression section 1031, an assistance information generation section 1032, and an assistance information encoding section 1033. The sensor information processing section 103 may be a general-purpose computer, and may be composed of, for example, a CPU 151 (processor), a ROM 152, a RAM 153, a hard disk drive 154, an input device 155, and a display 156 (display section). The CPU 151, which is a form of a processor, may be a GPU, a semiconductor device capable of performing other computation processing, or a combination thereof.

The video compression section 1031 compresses the surroundings video acquired from the surroundings video acquisition section S1 according to a predetermined video compression technique, and outputs the compressed video to the communication device 104. The video compression technique may involve but is not limited to known techniques, such as MPEG, H.264, and Motion JPEG.

The assistance information generation section 1032 calculates the position and the attitude of the bucket 113, the height of the ground (work ground surface) that is present vertically below the bucket 113, the position of the vessel 200 such as a dump truck, on the basis of the three-dimensional information acquired from the three-dimensional information acquisition section S2 and the attitude information acquired from the attitude information acquisition section S3.

The assistance information encoding section 1033 encodes the assistance information (the position and the attitude of the bucket 113, the height of the work ground surface, the position of the vessel 200 such as a dump truck, the rotation angle of the body section 102 with respect to the crawler 101) output from the assistance information generation section 1032 by a predetermined communications protocol, and outputs the encoded assistance information to the communication device 104. For encoding, a known technique may be used, but is not limited to, such as a CAN (Controller Area Network) communications protocol specified in ISO 11898.

<Internal Configuration Example of Assistance Information Generation Section 1032>

Figure 5:
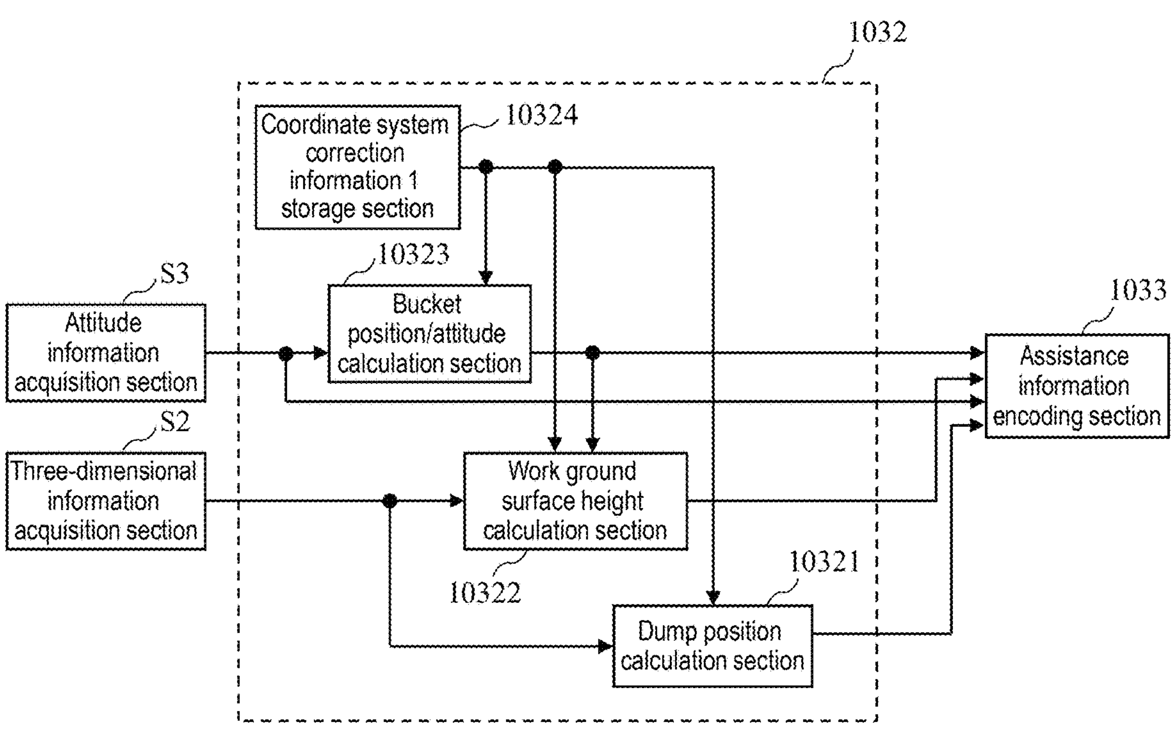
FIG. 5 is a diagram illustrating an internal configuration example of an assistance information generation section 1032.

FIG. 5 is a diagram illustrating an internal configuration example of the assistance information generation section 1032. The assistance information generation section 1032 processes the three-dimensional information acquired from the three-dimensional information acquisition section S2 and the attitude information acquired from the attitude information acquisition section S3, and generates assistance information including lightened (low volume) three-dimensional information. This assistance information generation section 1032 is provided with, as an example, a coordinate system correction information 1 storage section 10324, a dump position calculation section 10321, a bucket position/attitude calculation section 10323, and a work ground surface height calculation section 10322.

The coordinate system correction information 1 storage section 10324 stores correction information for integrating the coordinate systems of the detection signals of the three-dimensional information acquired from the three-dimensional information acquisition section S2 and the attitude information acquired from the attitude information acquisition section S3. Specifically, the correction information is information with six degrees of freedom (six-dimensional vector: translations and rotations in xyz directions) used for coordinate conversion from the sensor-based (sensor coordinate system) information to the machine body-based (body section coordinate system) information.

The dump position calculation section 10321, the bucket position/attitude calculation section 10323, and the work ground surface height calculation section 10322 output, on the basis of the correction information, assistance information as data on the coordinate system (body section coordinate system) rotating in accordance with the rotation of the body section 102 with respect to the crawler 101 with a reference point on the rotating axis of the work machine 100 and the bottom face of the body section 102, for example. This correction information may be calibrated at the time of shipping or checking the work machine 100 or an automatic calibration process may be performed at the time of starting the work machine 100.

The dump position calculation section 10321 calculates, on the basis of the three-dimensional information acquired from the three-dimensional information acquisition section S2 and the correction information acquired from the coordinate system correction information 1 storage section 10324, the position of the vessel 200 such as a dump truck (the position in the body section coordinate system). The position of the vessel 200 such as a dump truck is calculated, for example, as a three-dimensional coordinate value indicating the positions of four vertices of the top sides of the vessel.

The bucket position/attitude calculation section 10323 calculates, on the basis of the attitude information acquired from the attitude information acquisition section S3 and the correction information acquired from the coordinate system correction information 1 storage section 10324, the position and the attitude of the bucket 113 (the position and the attitude in the body section coordinate system). The position of the bucket 113 is, for example, a three-dimensional coordinate value of the coupling portion between the bucket 113 and the arm 112. The attitude of the bucket 113 is calculated, for example, as a three-dimensional unit direction vector connecting the coupling portion between the bucket 113 and the arm 112 and the tip center of the bucket 113.

The work ground surface height calculation section 10322 calculates, on the basis of the three-dimensional information acquired from the three-dimensional information acquisition section S2, the position of the bucket 113 output from the bucket position/attitude calculation section 10323, and the correction information acquired from the coordinate system correction information 1 storage section 10324, the height of the work ground surface (the height in the body section coordinate system). The computation of the height of the work ground surface may be achieved by calculating from the three-dimensional information an average height of the three-dimensional shape of the ground that is present vertically below the position of the bucket 113, for example.

<Configuration Example of Remote Control System 300>

Figure 6:
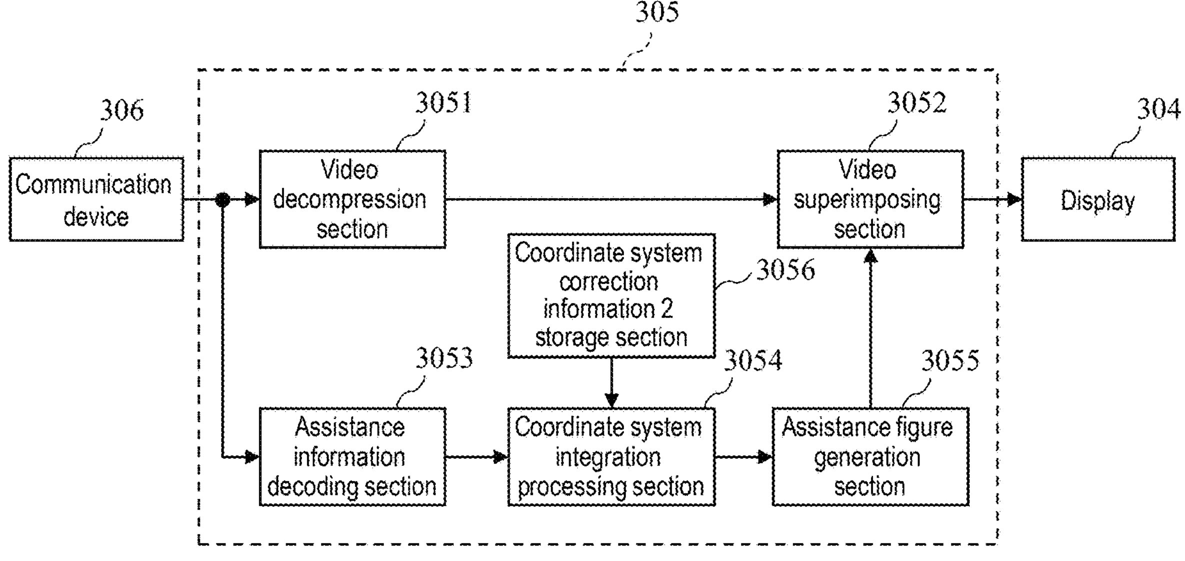
FIG. 6 is a diagram illustrating a configuration example of the remote control system (remote operation room) 300.

FIG. 6 is a diagram illustrating a configuration example of the remote control system (remote operation room) 300. The remote control system 300 includes the communication device 306, the operation control device 305, and the display 304.

From the communication device 104 in the work machine 100, the above-described video data subjected to video compression and the above-described encoded assistance information are transmitted through wireless communication via a wireless base station, not shown, received by the communication device 306 in the remote control system 300, and passed to the operation control device 305.

As illustrated in FIG. 6, the operation control device 305, as a configuration for generating a superimposed video including an AR image and performing display control thereof, is provided with, for example, a video decompression section 3051, a video superimposing section 3052, an assistance information decoding section 3053, a coordinate system integration processing section 3054, an assistance figure generation section 3055, and a coordinate system correction information 2 storage section 3056. The operation control device 305 also has the function of transmitting the control signals from the operation control section 302 from the communication device 306 to thereby control the various operations of the work machine 100, the details of which are omitted. The operation control device 305 may be implemented by a general-purpose computer including a CPU or a GPU (processor), various memories, and the like, and a computer program for performing the various operations indicated below. That is, the video decompression section 3051, the video superimposing section 3052, the assistance information decoding section 3053, the coordinate system integration processing section 3054, and the assistance figure generation section 3055 may be implemented by loading the corresponding computer program onto the internal memory in the processor.

The video decompression section 3051 decompresses (decodes) the above-described video data subjected to video compression (encoding) received by the communication device 306.

The assistance information decoding section 3053 decodes the above-described encoded assistance information received by the communication device 306.

The coordinate system correction information 2 storage section 3056 stores correction information for integrating the coordinate systems of the assistance information decoded by the assistance information decoding section 3053 and the video data decompressed by the video decompression section 3051. The correction information is information used for converting data described in the body section coordinate system to data in the camera coordinate system. In addition, for example, the correction information may be configured as a six-dimensional vector indicating the installed position and the attitude of the surroundings video acquisition section S1 in the body section coordinate system (the coordinate system that rotates in accordance with the rotation of the body section 102 with respect to the crawler 101, with a reference point on the rotating axis of the work machine 100 and the bottom face of the body section 102). Note that this correction information may be generated through calibration at the time of shipping or checking the work machine 100 or may be generated by performing an automatic calibration process at the time of starting the work machine 100.

The coordinate system integration processing section 3054 converts the assistance information (the position and the attitude of the bucket 113, the height of the work ground surface, the position of the vessel 200 such as a dump truck, the rotation angle of the body section 102 with respect to the crawler 101) to relative coordinate/attitude information with respect to the installation coordinates of the surroundings video acquisition section S1 (camera coordinate system), on the basis of the assistance information output by the assistance information decoding section 3053 and the correction information output from the coordinate system correction information 2 storage section 3056.

The assistance figure generation section 3055 generates each configuration of an AR image (images of various assistance figures) for representing the position and the attitude of the bucket 113, the height of the work ground surface, the position of the vessel 200 such as a dump truck, and the attitude of the crawler 101, on the basis of the assistance information converted by the coordinate system integration processing section 3054. The AR image is an image being displayed superimposed over an actual video of, e.g., the work machine 100 or the construction target (such as the ground), to assist the work by the work machine 100.

The video superimposing section 3052 generates a superimposed video in which the video obtained by decompression by the video decompression section 3051 is superimposed with the AR image generated by the assistance figure generation section 3055. The superimposed video is output to the display 304.

<Details of Video Compression Process and Assistance Information Generation Process>

Figure 7:
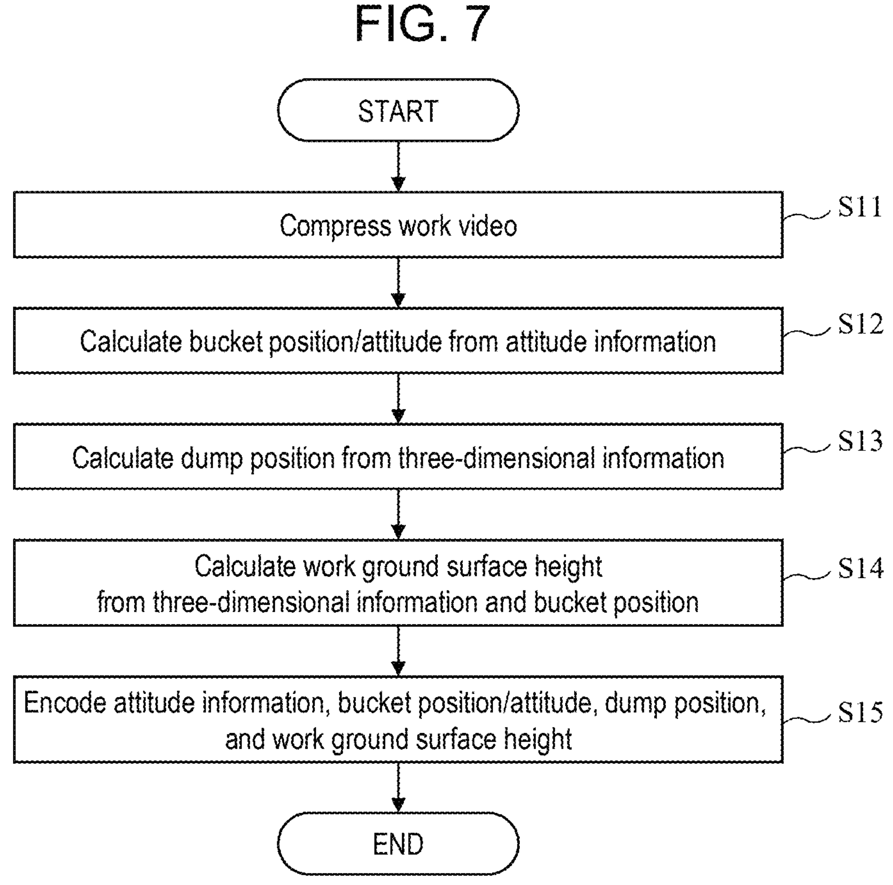
FIG. 7 is a flowchart for describing a video compression process by the sensor information processing section 103, and an assistance information generation process by the assistance information generation section 1032.

FIG. 7 is a flowchart for describing a video compression process by the sensor information processing section 103, and an assistance information generation process by the assistance information generation section 1032. In the following description, the agent performing each step is each processing section (such as the video compression section 1031, the bucket position/attitude calculation section 10323). However, the agent performing each step may be a processor since each process is implemented by the processor.

(i) Step S11

The video compression section 1031 compresses the video acquired by the surroundings video acquisition section S1 according to a predetermined technique (for example, MPEG, H.264, or the like), generates compressed video data, and outputs the compressed video data to the communication device 104. The communication device 104 transmits the compressed video data to the remote control system 300.

(ii) Step S12

The bucket position/attitude calculation section 10323 calculates the position and the attitude of the bucket 113 on the basis of the attitude information acquired from the attitude information acquisition section S3 and the correction information acquired from the coordinate system correction information 1 storage section 10324. Since the attitude information is information with respect to the attitude information acquisition section S3 (sensor coordinate system information), the attitude information is converted to body section (machine body) coordinate system information using the coordinate system correction information to calculate the position and the attitude of the bucket 113.

(iii) Step S13

The dump position calculation section 10321 calculates the position of the vessel 200 such as a dump truck on the basis of the three-dimensional information acquired from the three-dimensional information acquisition section S2 and the correction information acquired from the coordinate system correction information 1 storage section 10324. Like the attitude information, since the three-dimensional information is information with respect to the three-dimensional information acquisition section S2 (sensor coordinate system information), the three-dimensional information is converted to body section (machine body) coordinate system information using the coordinate system correction information to calculate the position of the vessel 200.

(iv) Step S14

The work ground surface height calculation section 10322 calculates the height of the work ground surface on the basis of the three-dimensional information acquired from the three-dimensional information acquisition section S2, the bucket position calculated in Step S12, and the correction information acquired from the coordinate system correction information 1 storage section 10324. That is, the computation of the height of the work ground surface may be achieved by, for example, calculating from the three-dimensional information an average height of the three-dimensional shape of the ground that is present vertically below the distal position of the tip of the bucket 113 and converting the result to the body section coordinate system using the correction information.

(v) Step S15

The assistance information encoding section 1033 generates encoded assistance information by encoding the position and the attitude of the bucket 113 calculated in Step S12, the position of the vessel 200 such as a dump truck calculated in Step S13, the height of the work ground surface calculated in Step S14, and the rotation angle of the body section 102 with respect to the crawler 101 acquired from the attitude information acquisition section S3, and outputs the encoded assistance information to the communication device 104. The communication device 104 transmits the encoded assistance information to the remote control system (remote operation room) 300.

Note that the order of performing Step S11 to Step S13 may be changed, and while any step of Step S11 to Step S12 is performed once, the other step may be performed twice or more.

<Details of Superimposed Video Generation Process>

Figure 8:
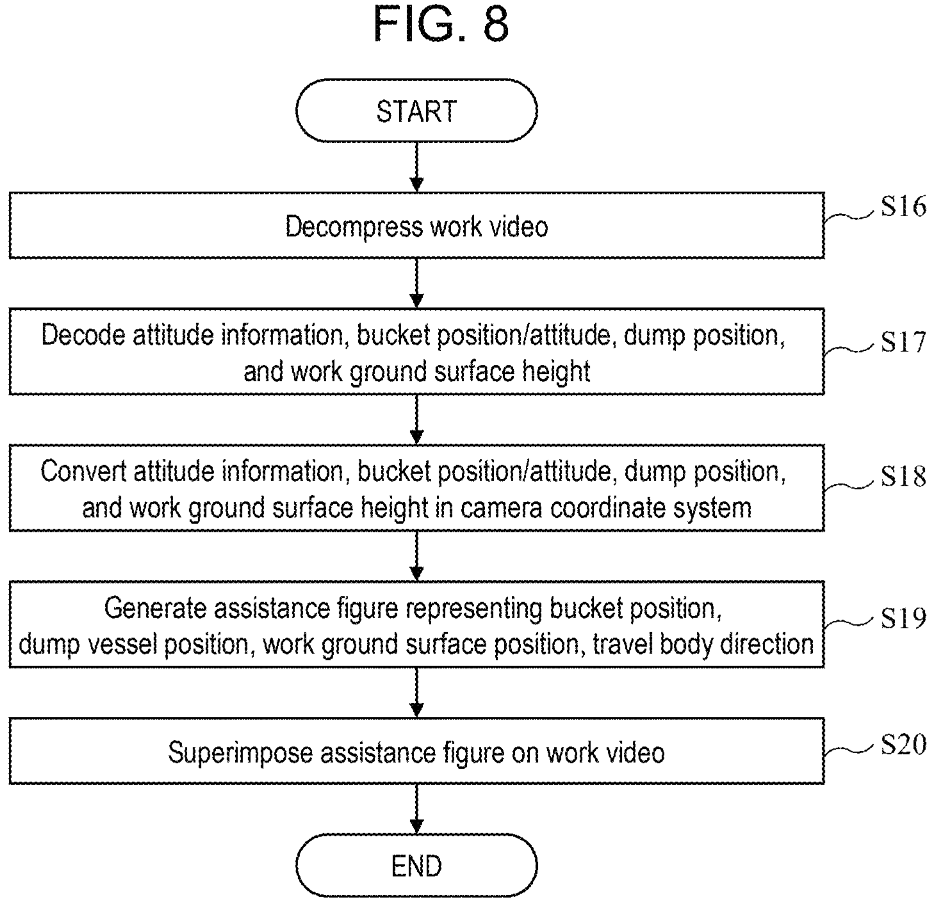
FIG. 8 is a flowchart for describing a process for generating a superimposed video including an AR image by an operation control device 305 in FIG. 6.

FIG. 8 is a flowchart for describing a process for generating a superimposed video including an AR image by the operation control device 305 in FIG. 6. In the following description, the agent performing each step is each processing section (such as the video decompression section 3051, the assistance information decoding section 3053). However, the agent performing each step may be a processor since each process is implemented by the processor.

(i) Step S16

The video decompression section 3051 decompresses (decodes) the compressed video data transmitted from the communication device 104 of the work machine 100 and received by the communication device 306 of the remote control system 300. The video data obtained by decompression is data in which an external scene viewed from the camera coordinate system is projected on the image plane.

(ii) Step S17

The assistance information decoding section 3053 decodes the encoded assistance information transmitted from the communication device 104 of the work machine 100 and received by the communication device 306 of the remote control system 300. The assistance information obtained by decoding is information in the body section coordinate system (machine body coordinate system).

(iii) Step S18

The coordinate system integration processing section 3054 converts the assistance information to the relative coordinate/attitude information with respect to the installed position of the surroundings video acquisition section S1, on the basis of the assistance information obtained by decoding in Step S17 and the correction information output from the coordinate system correction information 2 storage section 3056. That is, the assistance information is converted from the body section coordinate system information to the camera coordinate system information.

(iv) Step S19

The assistance figure generation section 3055 generates an AR image (assistance figure) representing the position and the attitude of the bucket 113, the height of the work ground surface, the position of the vessel 200 such as a dump truck, and the attitude of the crawler 101 on the basis of the coordinate converted assistance information obtained in Step S18.

The generation of an AR image may be achieved by computation to project line segments or figures on the three-dimensional space from the camera coordinates onto the image plane. For example, in the case of the vessel 200 with an upper-end opening, the position of which can be determined, a rectangle representing the upper-end opening of the vessel 200 is detected and drawn into a figure, thereby generating an AR image. In addition, template image data for a portion to be displayed (such as the vessel or the bucket) may be prepared beforehand, and a template image may be appropriately deformed according to the position of each portion, thereby generating an AR image. The transformation from the camera coordinates to the image plane is performed through perspective projection transformation or the like using internal parameters of the surroundings video acquisition section S1 (a focal length of a lens, an effective size per pixel of an imaging element, and coordinates of the center of the image) stored in a storage device, not shown, for example.

(v) Step S20

The video superimposing section 3052 generates a superimposed video in which the video obtained in Step S16 is superimposed with the AR image generated in Step S19 and outputs the superimposed video to the display 304.

<Examples of Superimposed Video>

Figure 9:
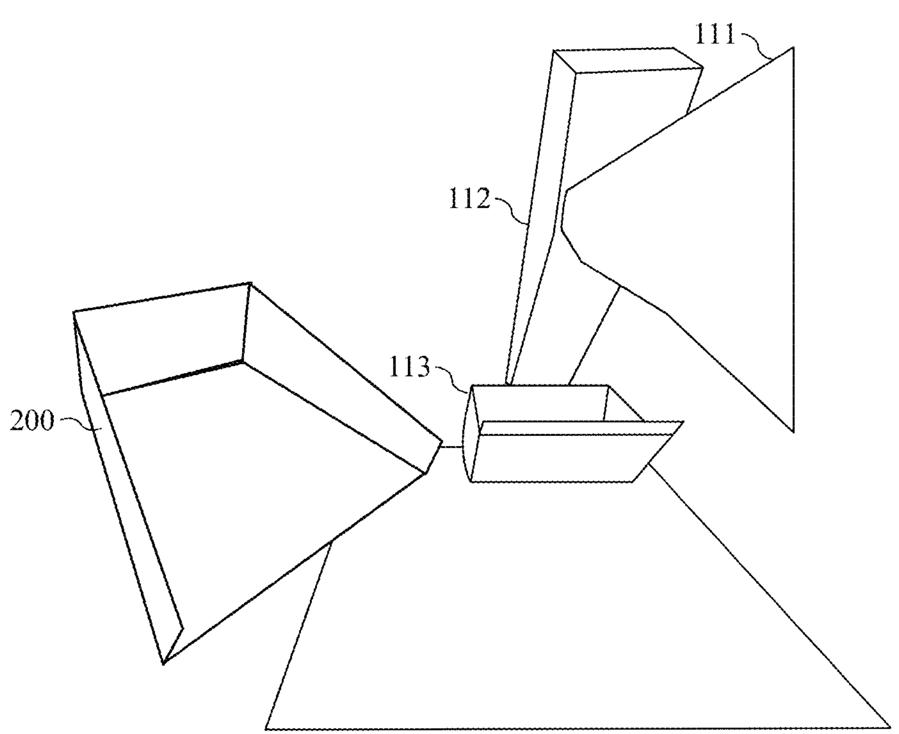
FIG. 9 is a diagram illustrating an example of a video (work machine front section video+surroundings video) obtained by decompression.
Figure 10:
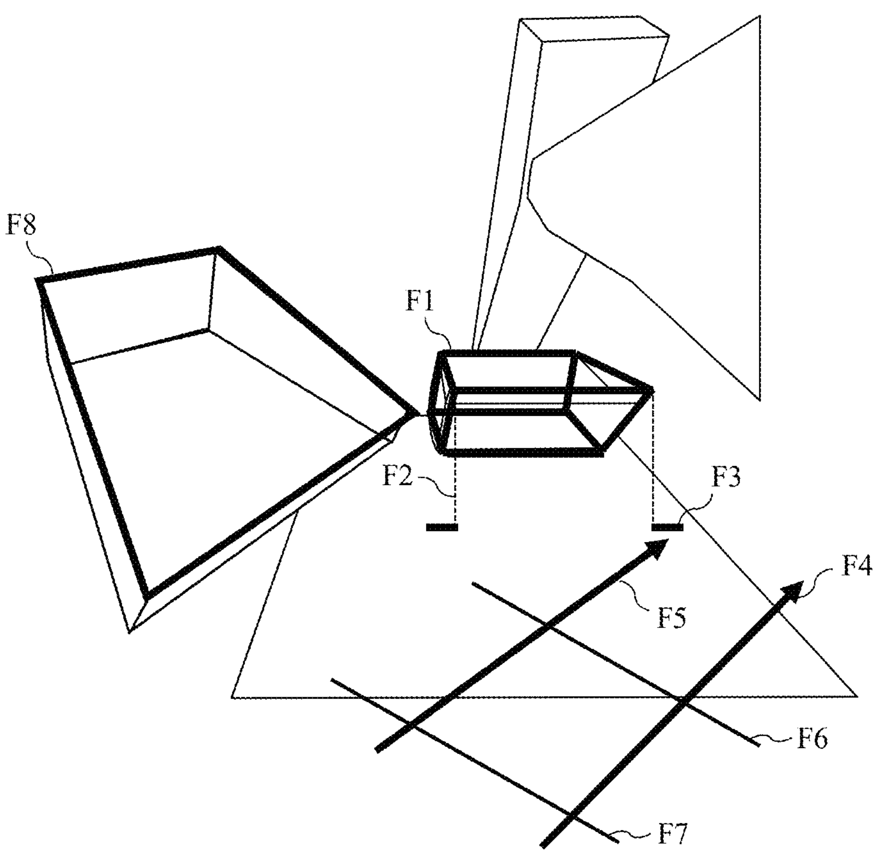
FIG. 10 is a diagram illustrating an example of a superimposed video obtained by superimposing an AR image on the video (FIG. 9) obtained by decompression.
Figure 11:
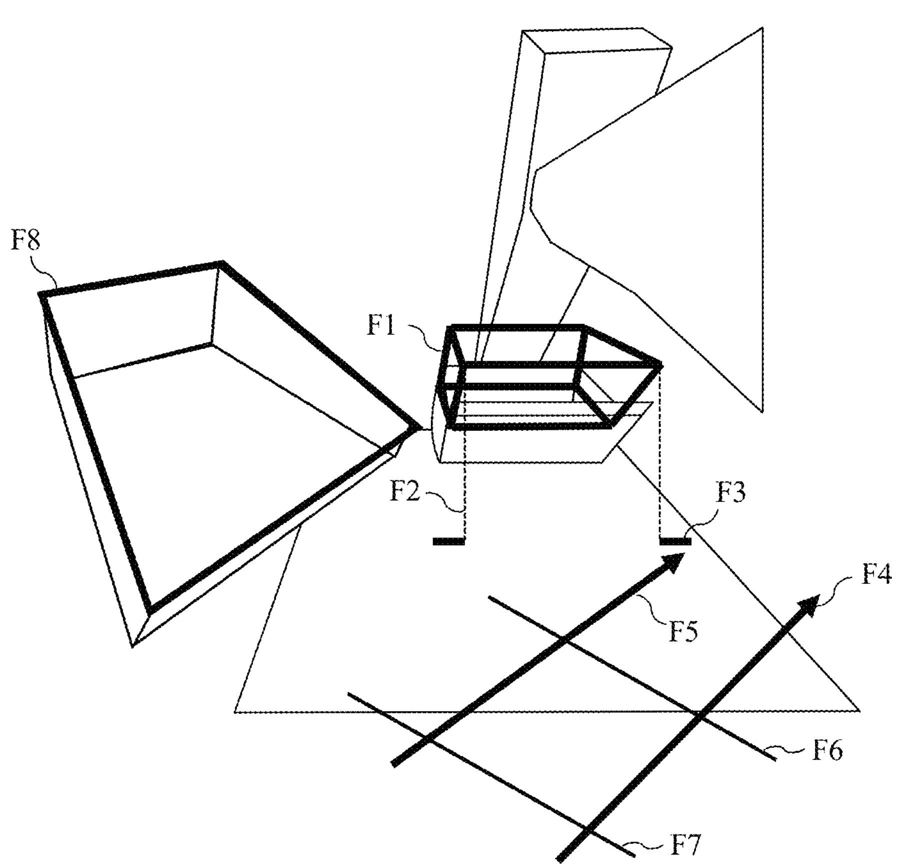
FIG. 11 is a diagram illustrating an example of a superimposed image (work machine front section video+surroundings video+AR image) displayed when a bucket 113 is vertically lifted.
Figure 12:
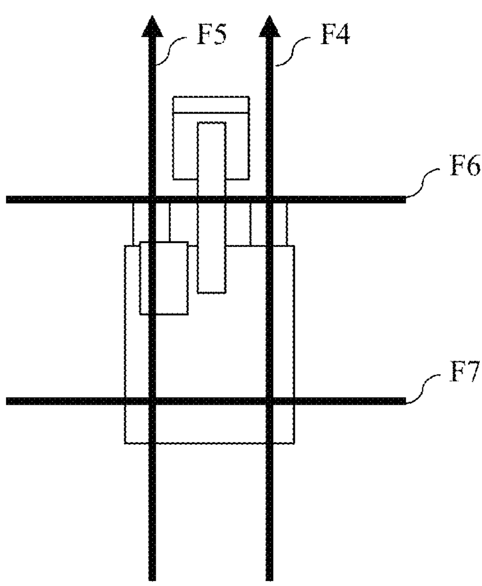
FIG. 12 is a diagram illustrating an example of a correspondence between auxiliary lines indicating a direction of a crawler 101 and a machine body in an AR image displayed in a superimposed image.
Figure 13:
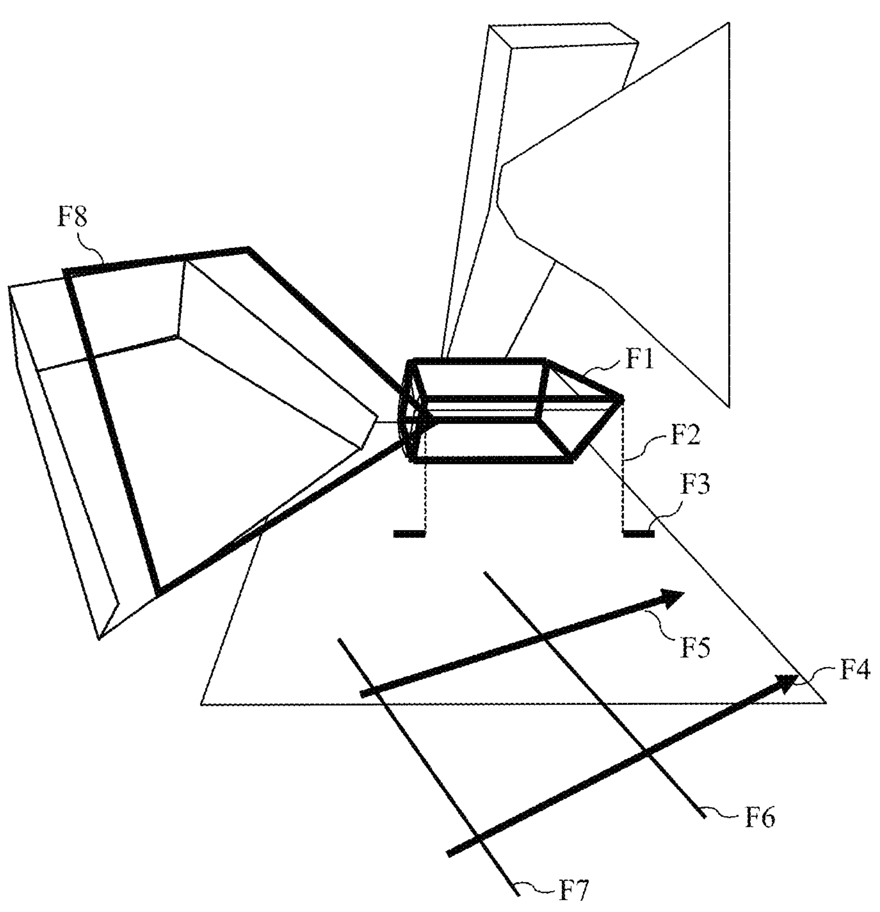
FIG. 13 is a diagram illustrating an example of an AR image displayed in a superimposed image.
Figure 14:
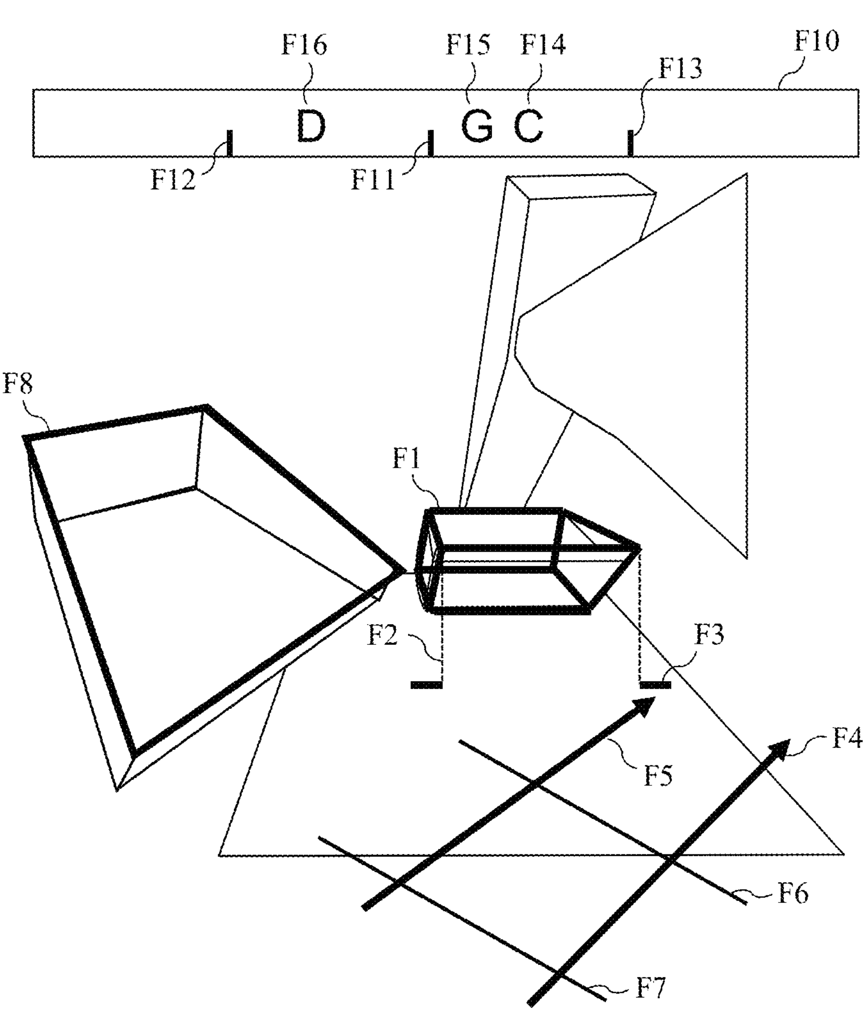
FIG. 14 is a diagram illustrating another example of an AR image displayed in a superimposed image.

FIG. 9 to FIG. 14 are diagrams for describing examples of a superimposed video (work machine front section video+surroundings video+AR image) in the first embodiment. FIG. 9 is a diagram illustrating an example of a video (work machine front section video+surroundings video) obtained by decompression. FIG. 10 is a diagram illustrating an example of a superimposed video obtained by superimposing an AR image on the video (FIG. 9) obtained by decompression. FIG. 11 is a diagram illustrating an example of a superimposed image (work machine front section video+surroundings video+AR image) displayed when the bucket 113 is vertically lifted. FIG. 12 is a diagram illustrating an example of a correspondence between auxiliary lines indicating a direction of the crawler 101 and the machine body in an AR image displayed in a superimposed image. FIG. 13 is a diagram illustrating an example of an AR image displayed in a superimposed image. FIG. 14 is a diagram illustrating another example of an AR image displayed in a superimposed image.

The video decompressed by the video decompression section 3051 is composed of, as illustrated in FIG. 9, for example, the boom 111, the arm 112, the bucket 113 (work machine front section), the vessel 200 such as a dump truck, the ground to be excavated (surroundings video), and the like. In the display 304, the video as illustrated in FIG. 9 is displayed including an AR image superimposed in the video superimposing section 3052, for example, as illustrated in FIG. 10.

As illustrated in FIG. 10, the AR image includes: a figure F1 indicating the position and the attitude of the bucket 113 during the excavation work of the work machine 100; a figure F3 indicating the position of the bucket 113 corresponding to its moving direction, that is, the position of a ground (work ground surface) to which the bucket 113 is about to move; a figure F2 connecting the above figures; a figure F4 indicating the position of the right part of the crawler 101; a figure F5 indicating the position of the left part of the crawler 101; a figure F6 indicating the position of the front end of the crawler 101; a figure F7 indicating the position of the rear end of the crawler 101; and a figure F8 indicating the positions of four vertices of the top sides of the vessel 200 such as a dump truck.

The figure F1 is displayed such that the attitude and the shape of the bucket are reflected on the position of the bucket 113 calculated by the bucket position/attitude calculation section 10323. Accordingly, even under the influence of video disturbance due to a video transmission delay and a communication packet loss during communication, the state of the bucket 113 can be clearly visually recognized using the AR image rendered based on the assistance information with a lower volume (lighter) than the video, and that is less likely to be affected by the packet loss in the transmission delay.

For example, FIG. 11 illustrates an example of a superimposed video displayed on the display 304 when the bucket 113 is lifted vertically through the operation of the operating column 303 of the remote control system 300. The video data acquired by the surroundings video acquisition section S1 is displayed on the display 304 in a delayed state relative to the state of the work machine 100 under the influence of various delays that occur during the compression process in the video compression section 1031, the decompression process in the video decompression section 3051, and the transmission from the communication device 104 to the communication device 306. Meanwhile, the assistance information generated by the assistance information generation section 1032 has a smaller data volume than the video data, and has a smaller delay associated with the encoding/decoding processes. Further, when the assistance information is transmitted in a packet different from the video data through network slicing or QoS (Quality of Service) control, a delay associated with the assistance information that occurs during the transmission from the communication device 104 to the communication device 306 is smaller than the delay associated with the video data. Thus, the figure F1 rendered based on the assistance information can indicate the position and the attitude of the bucket 113 of the work machine 100 with a lower delay as compared to the video data. Consequently, as illustrated in FIG. 11, when the operation of vertically lifting the bucket 113 is to be performed, the figure F1 can represent the operation of the bucket 113 in advance of the video data on the bucket 113. In addition, even when the video is partially or entirely distorted due to the communication packet loss, the state of the operation of the bucket 113 can be visually recognized by the superimposed display of the AR image by the operation control device 305 of the remote control system 300.

The figure F3 is displayed such that the position of the work ground surface is reflected. The computation of the position of the work ground surface may be achieved by the work ground surface height calculation section 10322 calculating from the above-described three-dimensional information an average height of the three-dimensional shape of the ground that is present vertically below the distal position of the bucket 113. By displaying the figure F3, even under the influence of video disturbance due to a video transmission delay and a communication packet loss during communication, the positional relationship between the bucket 113 and the work ground surface can be clearly visually recognized using the AR image rendered based on the assistance information with a lower volume (lighter) than the video data, and that is less likely to be affected by the packet loss in the transmission delay. Furthermore, by displaying the figure F3 on both sides of the work ground surface so as to sandwich the work ground surface (the area excavated by the bucket 113), the operator of the remote control system 300 can observe the work ground surface with clarity on the display 304 while also clearly recognizing the positional relationship between the bucket 113 and the work ground surface.

Further, the figure F2 is displayed as a figure connecting the figures F1 and F3. When the bucket 113 excavates a horizontal ground, the figure F1, the tip of the bucket 113, and the figure F3 extend in substantially the horizontal direction, whereas the figure F2 is perpendicular to the figures F1 and F3 and extends in substantially the vertical direction. By displaying the figure F2, the operator can easily recognize the distance between the bucket 113 and the ground.

The figure F4 to the figure F7 display the auxiliary lines indicating the direction of the crawler on the left and right sides and the front and rear ends of the crawler on the basis of the rotation angle of the body section 102 with respect to the crawler 101 acquired by the attitude information acquisition section S3 and the dimension values of the machine body.

In FIG. 12, the figure F4 indicates the position of the right part of the crawler 101; the figure F5 indicates the position of the left part of the crawler 101; the figure F6 indicates the position of the front end of the crawler 101; and the figure F7 indicates the position of the rear end of the crawler 101. Accordingly, even under the influence of video disturbance due to a video transmission delay and a communication packet loss during communication, the rotation angle of the body section 102 with respect to the crawler 101 can be clearly visually recognized using the AR image rendered based on the assistance information with a lower volume (lighter) than the video data, and that is less likely to be affected by the packet loss in the transmission delay.

The figure F8 displays the positions of four vertices of the top sides of the vessel 200 such as a dump truck on the basis of the position of the vessel 200 such as a dump truck calculated by the dump position calculation section 10321. Accordingly, even under the influence of video disturbance due to a video transmission delay and a communication packet loss during communication, the position of the vessel 200 such as a dump truck can be clearly visually recognized using the AR image rendered based on the assistance information lighter than the video data, and that is less likely to be affected by the packet loss in the transmission delay.

FIG. 13 illustrates, as an example, the superimposed video displayed on the display 304 in the operation of rotating the body section 102 with respect to the crawler 101 through the operation of the operating column 303 of the remote control system 300. The video acquired by the surroundings video acquisition section S1 is displayed on the display 304 in a delayed state relative to the state of the work machine 100 under the influence of various delays that occur during the compression process in the video compression section 1031, the transmission from the communication device 104 to the communication device 306, and the decompression process in the video decompression section 3051. Meanwhile, the assistance information generated by the assistance information generation section 1032 has a smaller data volume than the video data, and has a smaller delay associated with the encoding/decoding processes. Further, when the assistance information is transmitted in a packet different from the video data through network slicing or QoS control, a delay associated with the assistance information that occurs during the transmission from the communication device 104 to the communication device 306 is smaller than the delay associated with the video data. Thus, the figure F8 rendered based on the assistance information can indicate the position of the vessel 200 such as a dump truck with a lower delay as compared to the video data. In addition, the figure F4 to the figure F7 rendered based on the assistance information can indicate the rotating operation of the work machine 100 with a lower delay as compared to the video data. Consequently, as illustrated in FIG. 13, when the operation of rotating the body section 102 with respect to the crawler 101 is to be performed, the figure F8 can display in advance the position of the vessel 200 such as a dump truck, and the figure F4 to the figure F7 can display in advance the rotating operation of the body section 102 with respect to the crawler 101. In addition, even when the video is partially or entirely distorted due to the communication packet loss, the position of the vessel 200 such as a dump truck and the rotating operation of the body section 102 with respect to the crawler 101 can be visually recognized by the superimposed display of the AR image by the operation control device 305 of the remote control system 300. Note that the reason why the display position of the vessel 200 is displaced from the display position of the figure F8 in FIG. 13 is that the rotating operation of the crawler 101 causes differences in the coordinate system, which results in a displacement in the position at which the surroundings image (the image of the vessel 200) is superimposed with the AR image (the figure F8).

FIG. 14 illustrates a display example of advance rendering of the rotating operation of the body section 102 with respect to the crawler 101 in an AR image. In FIG. 14, a figure F10 is a figure display generated based on the assistance information, indicating the relationship of the rotation angle of the body section 102, the surrounding vehicle, and the terrain, to the crawler 101 of the work machine 100. The figure F10 includes a figure F11 indicating the front of the body section 102; a figure F12 indicating the left 90° direction of the body section 102; a figure F13 indicating the right 90° direction of the body section 102; a figure F14 indicating the direction of the crawler 101; a figure F15 indicating the direction in which the work ground surface is located; and a figure F16 indicating the direction in which the vessel 200 such as a dump truck is located. According to this superimposed video, it is possible to indicate the rotating operation of the work machine 100 with a lower delay as compared to the video. In addition, even when the video is partially or entirely distorted due to the communication packet loss, it is possible to indicate the rotating operation of the work machine 100.

<Display of AR Advance Rendering>

Figure 15:
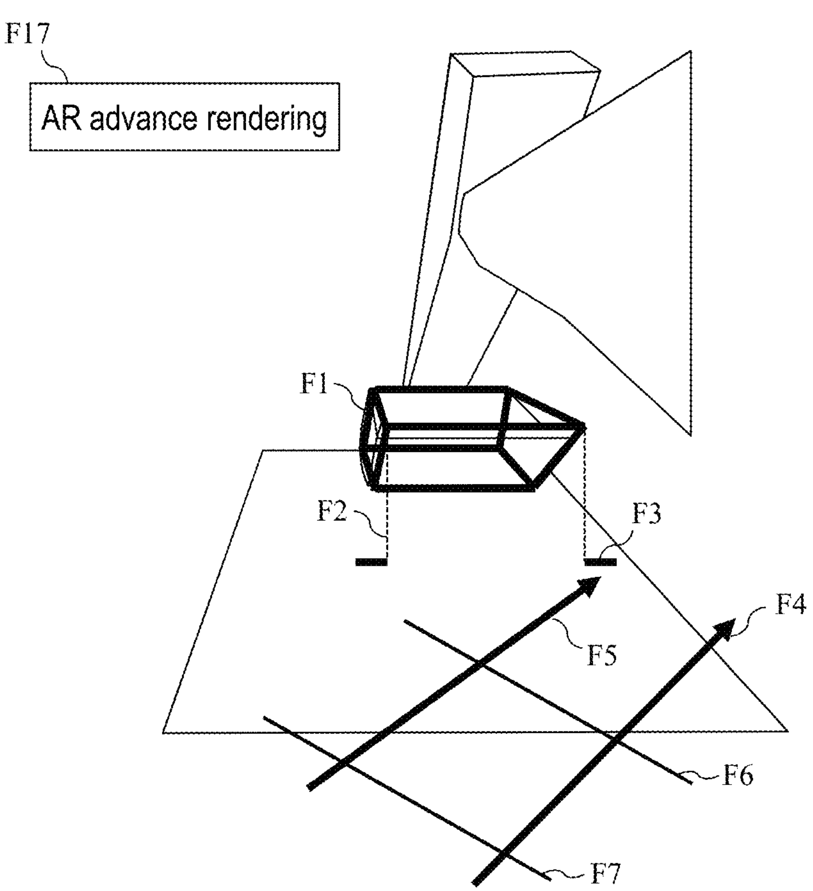
FIG. 15 is a diagram illustrating an example of a display of AR advance rendering F17 indicating that an AR figure is being superimposed in advance of the video.

FIG. 15 is a diagram illustrating an example of a display of AR advance rendering F17 indicating that an AR figure is being superimposed in advance of the video. According to the display of AR advance rendering F17, when a dump truck or the like is not located within a detection range of the work machine 100 or when the work machine 100 is in a static state, it is indicated to the remote operator of the work machine that an AR figure is being rendered in advance in the superimposed video, which allows preventing erroneous operation when the operation is started or restarted. That is, the operator can recognize that when the work machine 100 is in a static state, no displacement occurs between the AR figure and the video, but once the operation is started, the AR figure is displayed in advance of the video. This allows preventing erroneous operation. In addition, the operator can recognize that any displacement of each AR figure display with respect to the work video is caused by a video delay, not by calibration.

Note that in the examples illustrated in FIG. 10, FIG. 11, FIG. 13 to FIG. 15, all of the AR figures, the figures F1 to F8, are displayed in a superimposed manner. However, it is needless to mention that each of the figures F1 to F8 may not be displayed partially or entirely in the superimposed video depending on the position and the attitude of the bucket 113, the position of the work ground surface, the position of the vessel 200 such as a dump truck, and the rotation angle of the body section 102 with respect to the crawler 101.

<Communication Delays of Video and Assistance Information: Description by Timing Charts>

With reference to the timing charts of FIG. 16 to FIG. 18, communication delays that are added respectively to the video acquired by the surroundings video acquisition section S1 and the assistance information generated by the assistance information generation section 1032 will be described.

Figure 16:
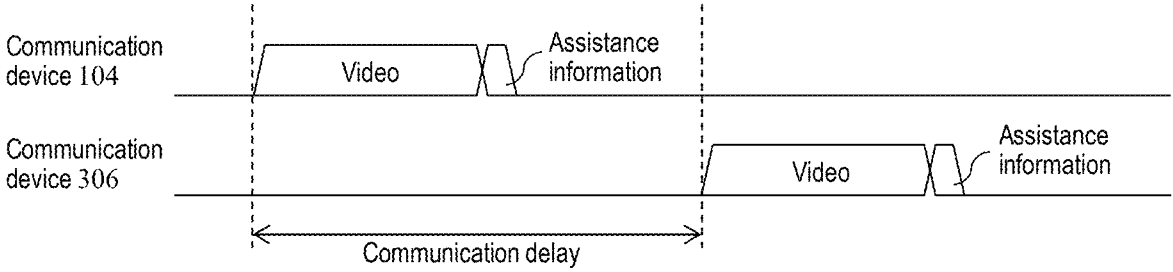
FIG. 16 is a diagram illustrating a communication delay that occurs when without employing the configuration of a first embodiment, a superimposed video including a superimposed AR image is generated in the work machine 100 and transmitted to the remote control system 300 or when without performing network slicing, QoS control, the video acquired by the surroundings video acquisition section S1 and the assistance information generated by the assistance information generation section 1032 are transmitted to the remote control system 300 in the same communication packet.

(i) FIG. 16 is a diagram illustrating a communication delay that occurs when without employing the configuration of the first embodiment, a superimposed video including a superimposed AR image is generated in the work machine 100 and transmitted to the remote control system 300 or when without performing network slicing, QoS control, the video acquired by the surroundings video acquisition section S1 and the assistance information generated by the assistance information generation section 1032 are transmitted to the remote control system 300 in the same communication packet. In this case, since the video data and the assistance information are subjected to the same communication delay, each type of information transmitted from the communication device 104 will be received by the communication device 306 with the illustrated communication delay.

Figure 17:
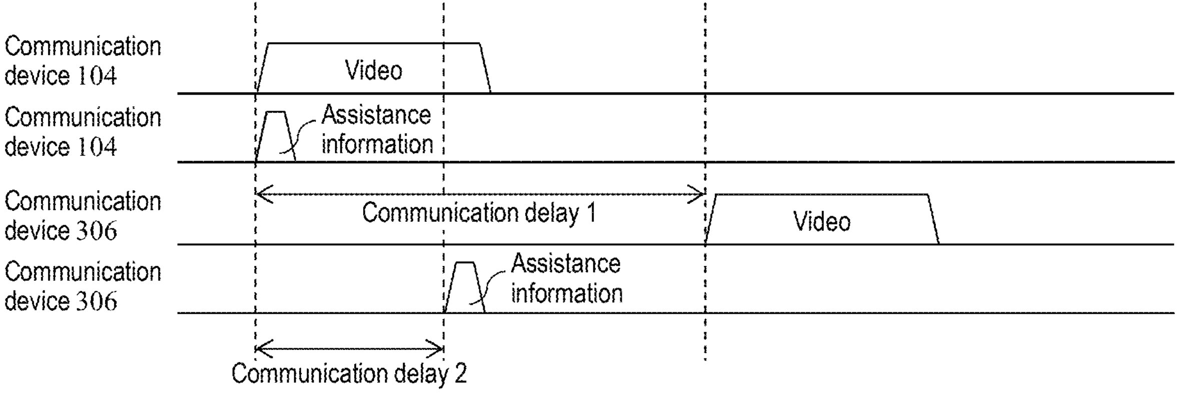
FIG. 17 is a diagram illustrating communication delays that are added respectively to the video acquired by the surroundings video acquisition section S1 and the assistance information generated by the assistance information generation section 1032 when the configuration of the first embodiment is employed.

(ii) FIG. 17 is a diagram illustrating communication delays that are added respectively to the video acquired by the surroundings video acquisition section S1 and the assistance information generated by the assistance information generation section 1032 when the configuration of the first embodiment is employed. As illustrated in FIG. 17, the video data and the assistance information are transmitted in parallel (for example, in different communication systems) from the communication device 104 to the communication device 306. In the communication device 306, a communication delay in the amount indicated by a communication delay 1 is added to the video data, and a communication delay in the amount indicated by a communication delay 2 different from the communication delay 1 is added to the assistance information. Since the communication delay 2 is smaller than the communication delay 1 through the network slicing, QoS control, the communication delay being added to the assistance information received by the communication device 306 is smaller than the communication delay being added to the video data.

Accordingly, as illustrated in the timing chart of FIG. 18, according to the configuration of the first embodiment, for a video 1 illustrated in FIG. 18, it is possible to generate an AR image on the basis of assistance information 2 transmitted later than the video 1 from the communication device 104 to the communication device 306, and generate a superimposed video in which the AR image is superimposed. Thus, a reduction of the work efficiency caused by a video transmission delay can be prevented.

Note that the description herein has been made in consideration of only the communication delays from the communication device 104 to the communication device 306. However, in addition to this, according to the configuration of the first embodiment, even when there is a difference between the processing delay of the video compression/decompression processes and the processing delay of the assistance information encoding/decoding processes, a reduction of the work efficiency caused by a delay can be prevented.

Figure 18:
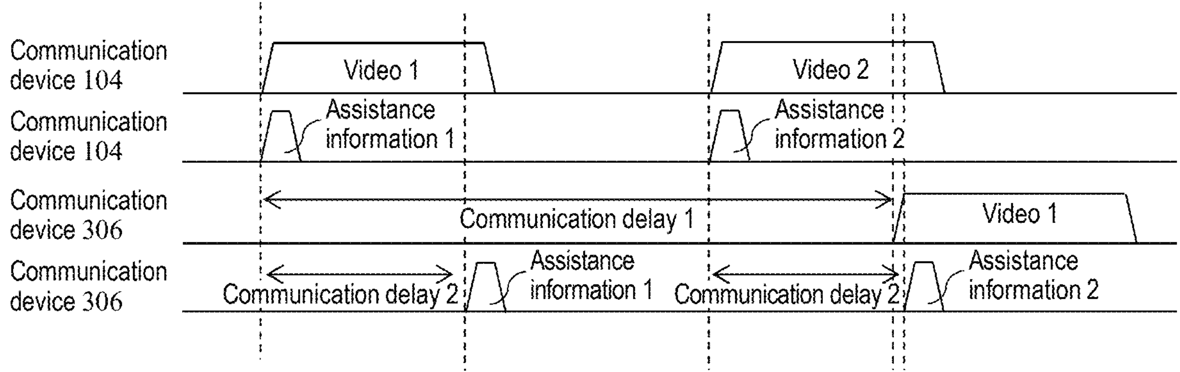
FIG. 18 is a diagram illustrating an example of a superimposed video obtained by superimposing, on a video 1, an AR image generated on the basis of assistance information 2 transmitted later than the video 1 from a communication device 104 to a communication device 306.

In addition, in FIG. 18, the video data and the assistance information are transmitted from the communication device 104 at the same timing and cycle. However, it is needless to mention that they need not be transmitted at the same timing and cycle. In addition, in the illustration of FIG. 18, the delay time added to the assistance information 1 is equal to the delay time added to the assistance information 2. However, each delay time may vary depending on the operation state or the like of the communication facilities between the communication device 104 and the communication device 306, and even with such variations, the advantageous effect produced in the first embodiment will not be reduced.

As described above, according to the first embodiment, on the basis of the assistance information including the three-dimensional information lightened by the assistance information generation section 1032 of the work machine 100 and the video acquired by the surroundings video acquisition section S1, the superimposed video in which the AR image is superimposed in the operation control device 305 of the remote control system 300 is output to the display 304. Accordingly, it is possible to visually recognize the bucket 113, the vessel 200 such as a dump truck, the work ground surface, the rotation angle of the body section 102 with respect to the crawler 101, and the like, without being impaired by video disturbance due to a video delay and a communication packet loss.

(2) Second Embodiment

(2-1) Basic Embodiment

With reference to FIG. 19 to FIG. 25, the work machine control system 1 according to a second embodiment (basic embodiment) will be described. Note that the overall configuration of the work machine control system 1 of the second embodiment is similar to the first embodiment, and therefore overlapping description is omitted. The second embodiment differs from the first embodiment in a coordinate conversion process applied to the assistance information by the coordinate system integration processing section 3054.

<Introducing Coordinate Conversion in Consideration of Rotating Operation>

Figure 19:
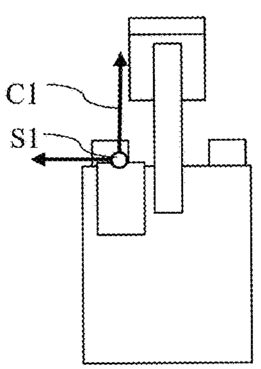
FIG. 19 is a diagram illustrating an attitude example of the work machine 100 in acquiring the video 1 and an attitude example of the work machine 100 in acquiring the assistance information 2 when the work machine 100 is operated such that a body section 102 rotates leftward with respect to the crawler 101.
Figure 19:
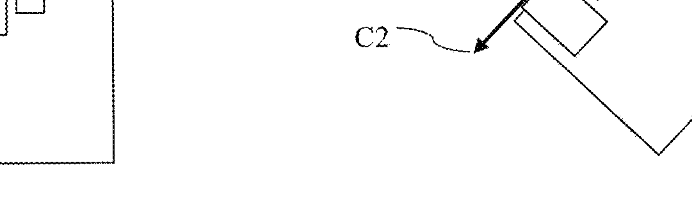

In the first embodiment, there is a time difference between the time when the surroundings video acquisition section S1 of the work machine 100 has acquired the video corresponding to the video data received by the communication device 306 of the remote control system 300 and the time when the three-dimensional information acquisition section S2 and the attitude information acquisition section S3 of the work machine 100 have acquired the information on which the assistance information is based, received by the communication device 306 of the remote control system 300. For example, in the case of the situation shown by the timing chart of FIG. 18, a superimposed video will be generated using the video 1 and the assistance information 2. However, there is a difference between the timing at which the video 1 is transmitted from the communication device 104 and the timing at which the assistance information 2 is transmitted from the communication device 104. Thus, when the work machine 100 is operated such that the body section 102 rotates leftward with respect to the crawler, the attitude of the work machine 100 in acquiring the video 1 and the attitude of the work machine 100 in acquiring the assistance information 2 are as illustrated in FIG. 19. Here a coordinate system C1 is a camera coordinate system (a coordinate system representing the camera attitude) when the work machine 100 has acquired the video 1 and the assistance information 1. A coordinate system C2 is a camera coordinate system (a coordinate system representing the camera attitude) when the work machine 100 has acquired the video 2 and the assistance information 2.

In the first embodiment, when the coordinate system integration processing section 3054 performs coordinate conversion on the assistance information 2, the coordinate system C2 is used as the coordinate system after the conversion. Accordingly, the superimposed video including the superimposed AR image as illustrated in FIG. 13 will be displayed on the display 304. However, this conversion method may cause a displacement between the video of the surrounding terrain and vehicle and the display position of the AR figure when the work machine 100 is rotated, causing a larger load for the operator.

Then, in the second embodiment (basic embodiment and variation), when the coordinate system integration processing section 3054 performs coordinate conversion on the assistance information 2, the coordinate system integration processing section 3054 performs conversion in consideration of the difference between the assistance information 1 and the assistance information 2, and uses the coordinate system C1 as the coordinate system after the conversion, so that the displacement between the video and the AR image can be eliminated and also the video can be displayed to allow the operation of the work machine 100 without being impaired by video disturbance due to a video data delay and a communication packet loss.

<Internal Configuration Example of Operation Control Device 305>

Figure 20:
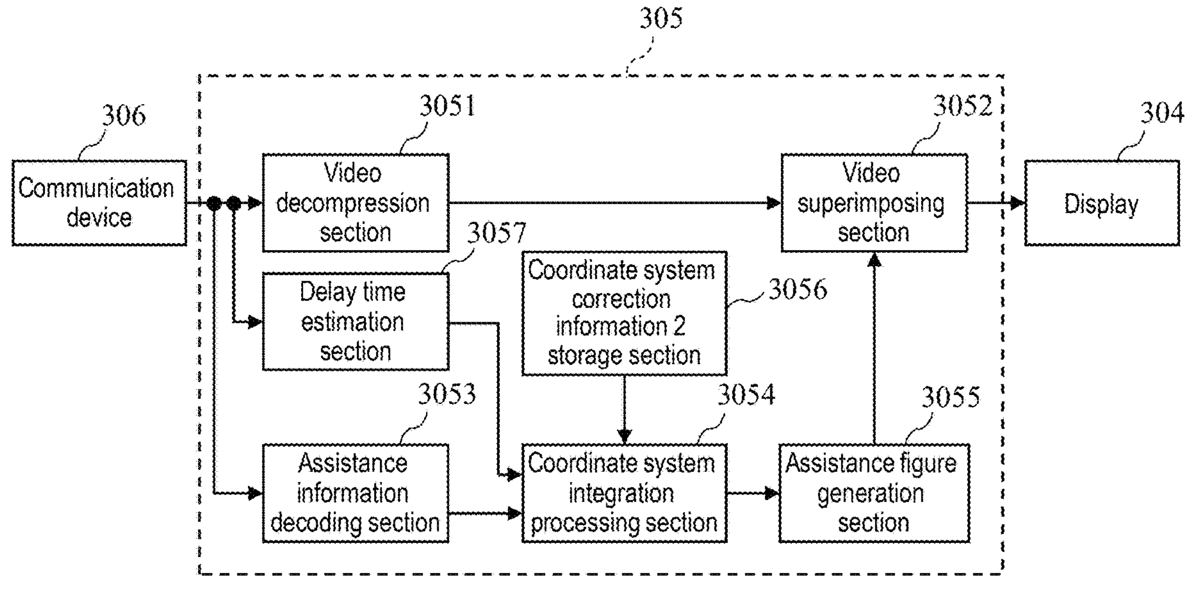
FIG. 20 is a diagram illustrating an internal configuration example of the operation control device 305 according to a second embodiment (basic embodiment).

FIG. 20 is a diagram illustrating an internal configuration example of the operation control device 305 according to the second embodiment (basic embodiment). The operation control device 305 includes a delay time estimation section 3057 in addition to the configuration of the first embodiment (FIG. 6).

The delay time estimation section 3057 estimates the delay time 1 being added to the video data and the delay time 2 being added to the assistance information on the basis of the data received by the communication device 306. For example, the communication device 306 has a function of monitoring a communication state. In such a case, the delay time estimation section 3057 estimates what degree of delay time is currently generated from the communication state information detected by the communication device 306.

The coordinate system integration processing section 3054 converts the assistance information to the information in the coordinate system C1 on the basis of the delay time (estimated value) output from the delay time estimation section 3057 and the correction information output from the coordinate system correction information 2 storage section 3056. For example, the coordinate system integration processing section 3054 compares the delay time of the surroundings video data (first delay time) and the delay time of the assistance information (second delay time), and determines the assistance information (the assistance information at a second timing) needed to display in advance the work state of the work machine 100 in an AR image. In addition, the coordinate system integration processing section 3054 calculates the difference between the first delay time and the second delay time, and calculates the amount of conversion from the coordinate system C2 to the coordinate system C1 on the basis of the difference between the rotation angle of the body section 102 with respect to the crawler 101 at an assistance time back by the difference in the delay time and the rotation angle of the body section 102 with respect to a crawler 202 in the latest assistance time information. The coordinate system integration processing section 3054 converts the assistance information (coordinate system C2) to the coordinate system C1 (the coordinate system in acquiring the surroundings video at a first timing) of the attitude of the work machine, generates the coordinate converted assistance information, and generates therefrom an AR image (assistance figure). Note that description of the other components will be omitted since they overlap with the first embodiment (FIG. 6).

<Superimposed Video Generation Process>

Figure 21:
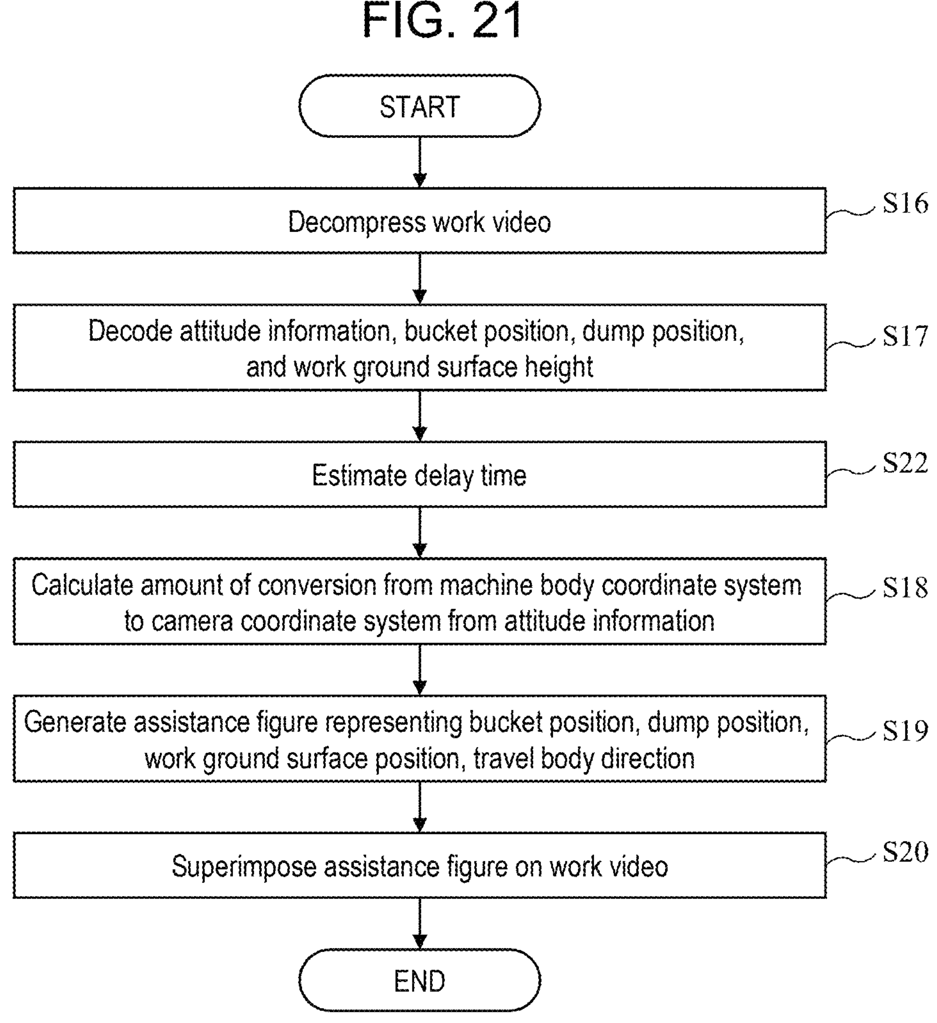
FIG. 21 is a flowchart for describing a process for generating a superimposed video including an AR image by the operation control device 305 (see FIG. 20) according to the second embodiment (basic embodiment).

FIG. 21 is a flowchart for describing a process for generating a superimposed video including an AR image by the operation control device 305 (see FIG. 20) according to the second embodiment (basic embodiment). Step S22 is performed after Step S16 and Step S17 that are identical to those of the first embodiment (FIG. 8). Note that Steps S16, S17, S19, S20 are identical to those of the first embodiment (FIG. 8), and therefore description will be omitted.

In Step S22, the delay time estimation section 3057 estimates delay times being added respectively to the video data and the assistance information on the basis of the data received by the communication device 306.

In Step S17, the coordinate system integration processing section 3054 converts the assistance information to the information in the coordinate system C1 on the basis of the delay times output from the delay time estimation section 3057 and the correction information output from the coordinate system correction information 2 storage section 3056.

(2-2) Variation

The variation includes the process of detecting a delay time on the basis of information embedded in the video data on the transmission side (on the work machine 100 side), and reflecting the delay time on the coordinate conversion, unlike the above-described basic embodiment in which a delay time is detected from the communication state information detected by the communication device 306.

<Internal Configuration Example of Sensor Information Processing Section 103>

Figure 22:
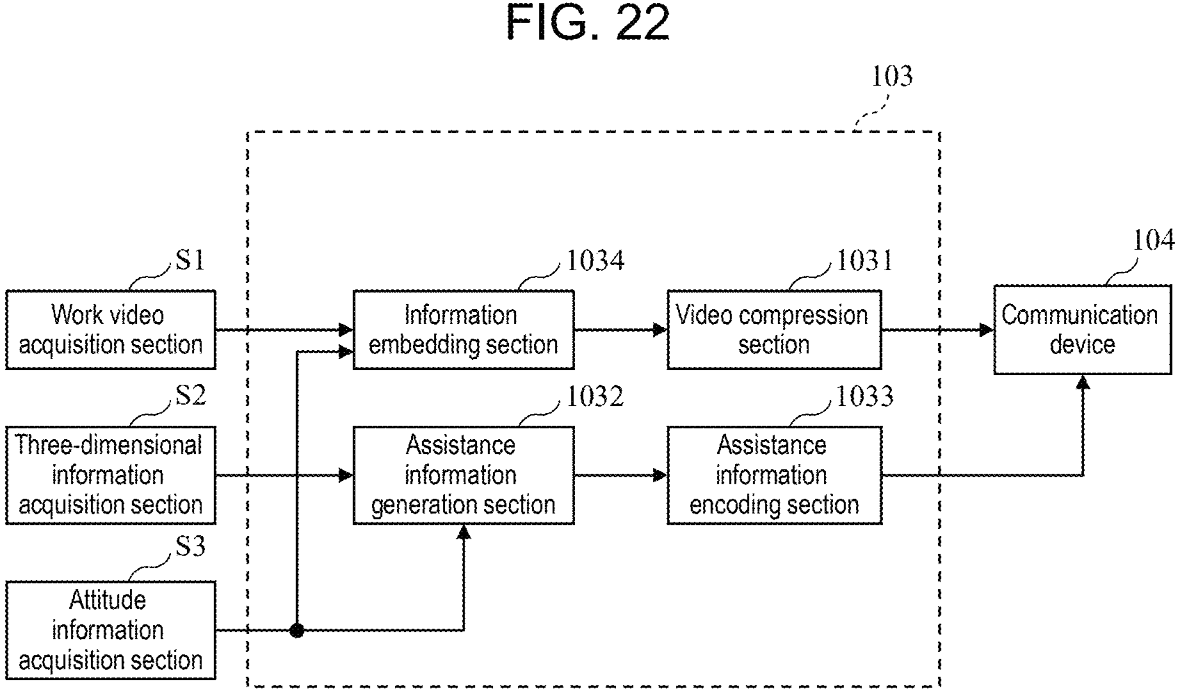
FIG. 22 is a diagram illustrating an internal configuration example 1 of the sensor information processing section 103 according to the second embodiment (variation).

(i) FIG. 22 is a diagram illustrating an internal configuration example 1 of the sensor information processing section 103 according to the second embodiment (variation).

The sensor information processing section 103 includes an information embedding section 1034 in addition to the configuration of the first embodiment (FIG. 4). The information embedding section 1034 embeds the rotation angle of the body section 102 with respect to the crawler 101 acquired by the attitude information acquisition section S3 into pixels in a portion of the video acquired by the surroundings video acquisition section S1. Description of the other components will be omitted since they overlap with the first embodiment (FIG. 4).

Figure 23:
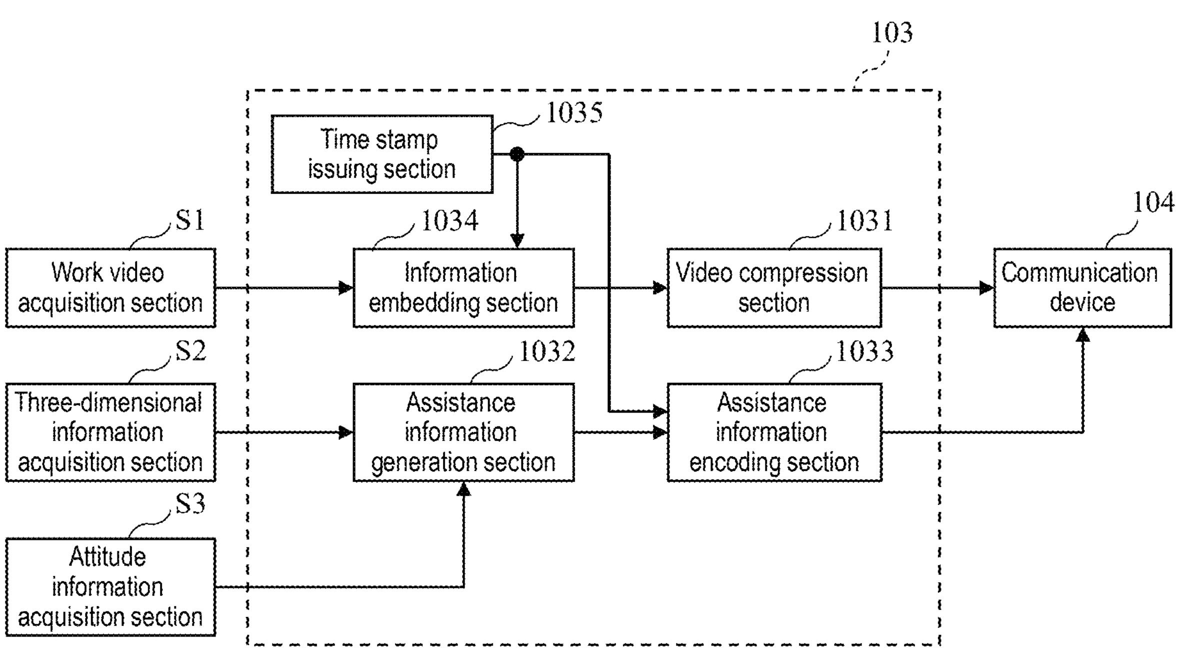
FIG. 23 is a diagram illustrating an internal configuration example 2 of the sensor information processing section 103 according to the second embodiment (variation).

(ii) FIG. 23 is a diagram illustrating an internal configuration example 2 of the sensor information processing section 103 according to the second embodiment (variation). The sensor information processing section 103 includes a time stamp issuing section 1035 in addition to the configuration of FIG. 22. The information embedding section 1034 embeds time stamp information into pixels in a portion of the video acquired by the surroundings video acquisition section S1. The assistance information encoding section 1033 encodes the time stamp output from the time stamp issuing section 1035 in addition to the data encoded in the first embodiment. Description of the other components will be omitted since they overlap with the first embodiment (FIG. 4).

<Information Embedding Method>

Figure 24:
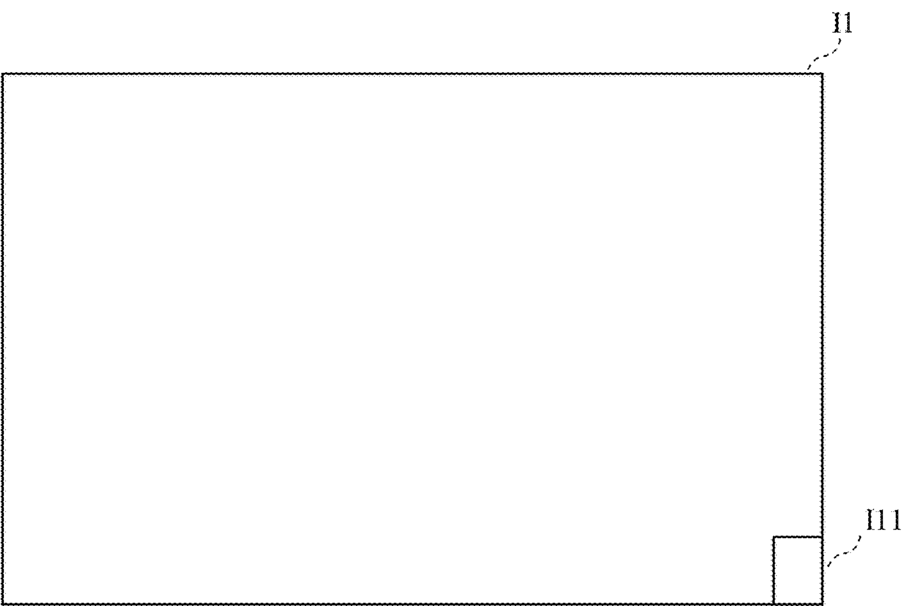
FIG. 24 is a diagram illustrating an example of a method of embedding information into pixels in a portion of the video acquired by the surroundings video acquisition section S1 in an information embedding section 1034.

FIG. 24 is a diagram illustrating an example of a method of embedding information into pixels in a portion of the video acquired by the surroundings video acquisition section S1 in the information embedding section 1034.

The information embedding section 1034 replaces a pixel value of a pixel I11 not being a hindrance to the operator of the remote control system 300 in a portion of a video I1 acquired by the surroundings video acquisition section S1 with the rotation angle of the body section 102 with respect to the crawler 101 acquired by the attitude information acquisition section S3 or the time stamp information output by the time stamp issuing section 1035. Note that such replacement of the pixel value may be performed for the number of pixels in consideration of a video input to the video compression section 1031 through interlacing, a macroblock size in the compression process by the video compression section 1031, and the like. For example, when compressing the interlaced video using H.264, with a macroblock size of 16×16, the information embedding section 1034 may replace the pixel values of 32 pixels in height and 16 pixels in width with these information.

<Internal Configuration Example of Operation Control Device 305>

Figure 25:
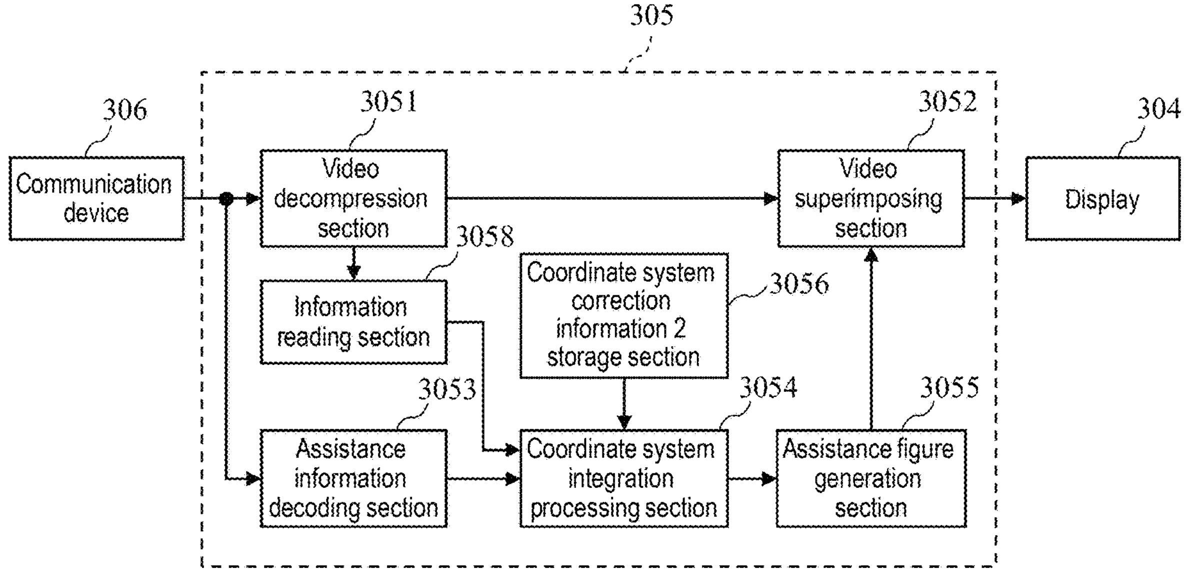
FIG. 25 is a diagram illustrating an internal configuration example of the operation control device 305 corresponding to the sensor information processing section 103 in FIG. 22 and FIG. 23.

FIG. 25 is a diagram illustrating an internal configuration example of the operation control device 305 corresponding to the sensor information processing section 103 in FIG. 22 and FIG. 23.

The operation control device 305 includes an information reading section 3058 in addition to the configuration of the first embodiment (FIG. 6).

The information reading section 3058 reads, from the pixel values of a portion of the video data decompressed by the video decompression section 3051, the rotation angle of the body section 102 with respect to the crawler 101 acquired by the attitude information acquisition section S3 or the time stamp information output by the time stamp issuing section 1035, which are embedded by the information embedding section 1034 of the sensor information processing section 103.

The coordinate system integration processing section 3054 converts the assistance information (coordinate system C2) to the information in the coordinate system C1 on the basis of the information read by the information reading section 3058 and the assistance information decoded by the assistance information decoding section 3053. When the information read by the information reading section 3058 is the rotation angle of the body section 102 with respect to the crawler 101, the coordinate system integration processing section 3054 calculates the amount of conversion to the coordinate system C1 on the basis of the difference between the rotation angle of the body section 102 with respect to the crawler 101 in the decoded assistance information and the read rotation angle. Meanwhile, when the information read by the information reading section 3058 is the time stamp information output by the time stamp issuing section 1035, the coordinate system integration processing section 3054 compares the time stamp information in the decoded assistance information and the read time stamp information, and calculates the amount of conversion from the coordinate system C2 to the coordinate system C1 on the basis of the difference between the rotation angle of the body section 102 with respect to the crawler 101 in the assistance information at a previous time by the time difference in the time stamp information and the rotation angle of the body section 102 with respect to the crawler 101 in the latest assistance information. Description of the other components will be omitted since they overlap with the first embodiment (FIG. 6).

<Video Compression Process and Assistance Information Generation Process>

Figure 26:
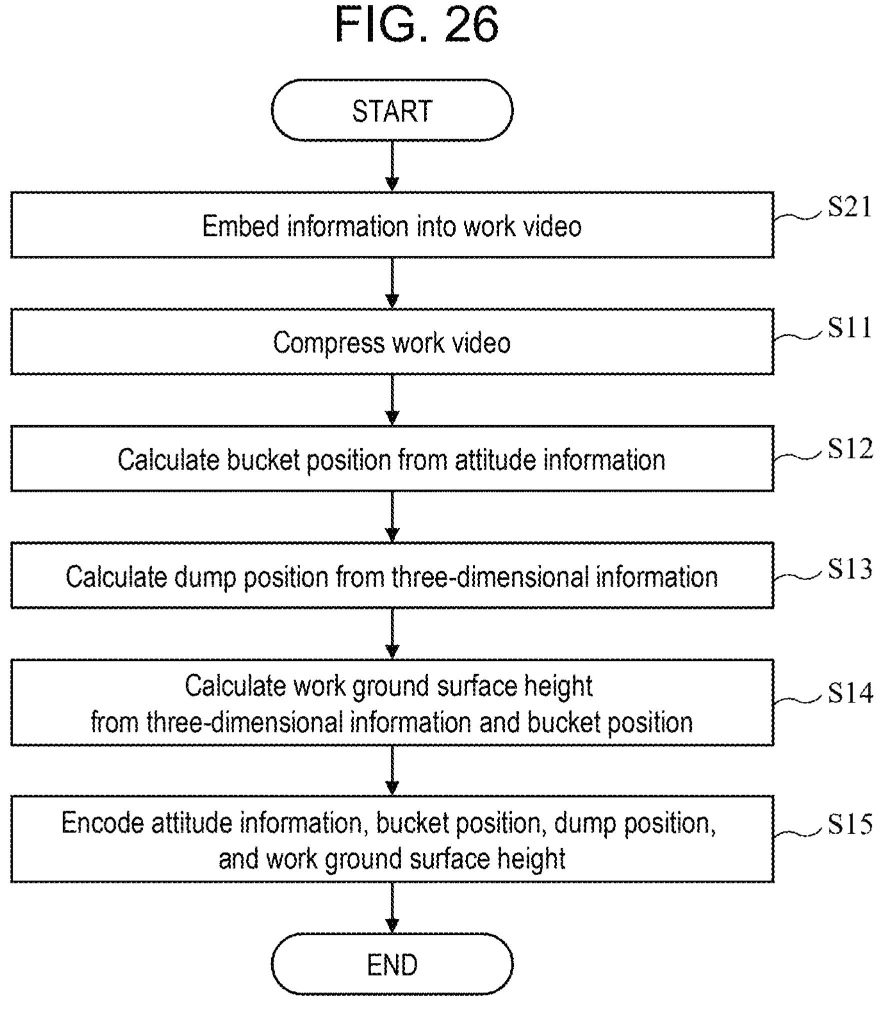
FIG. 26 is a flowchart for describing a video compression process and an assistance information generation process by the sensor information processing section 103 (see FIG. 21 or FIG. 22) according to the second embodiment (variation).

FIG. 26 is a flowchart for describing a video compression process and an assistance information generation process by the sensor information processing section 103 (see FIG. 22 or FIG. 23) according to the second embodiment (variation). In FIG. 26, since the processes in Step S11 to Step S15 are identical to those of the first embodiment (see FIG. 7), description of these steps will be omitted.

In Step S21, the information embedding section 1034 replaces the pixel values of the portion of the video acquired by the surroundings video acquisition section S1 with the rotation angle of the body section 102 with respect to the crawler 101 acquired by the attitude information acquisition section S3 or the time stamp information output by the time stamp issuing section 1035.

<Superimposed Video Generation Process>

Figure 27:
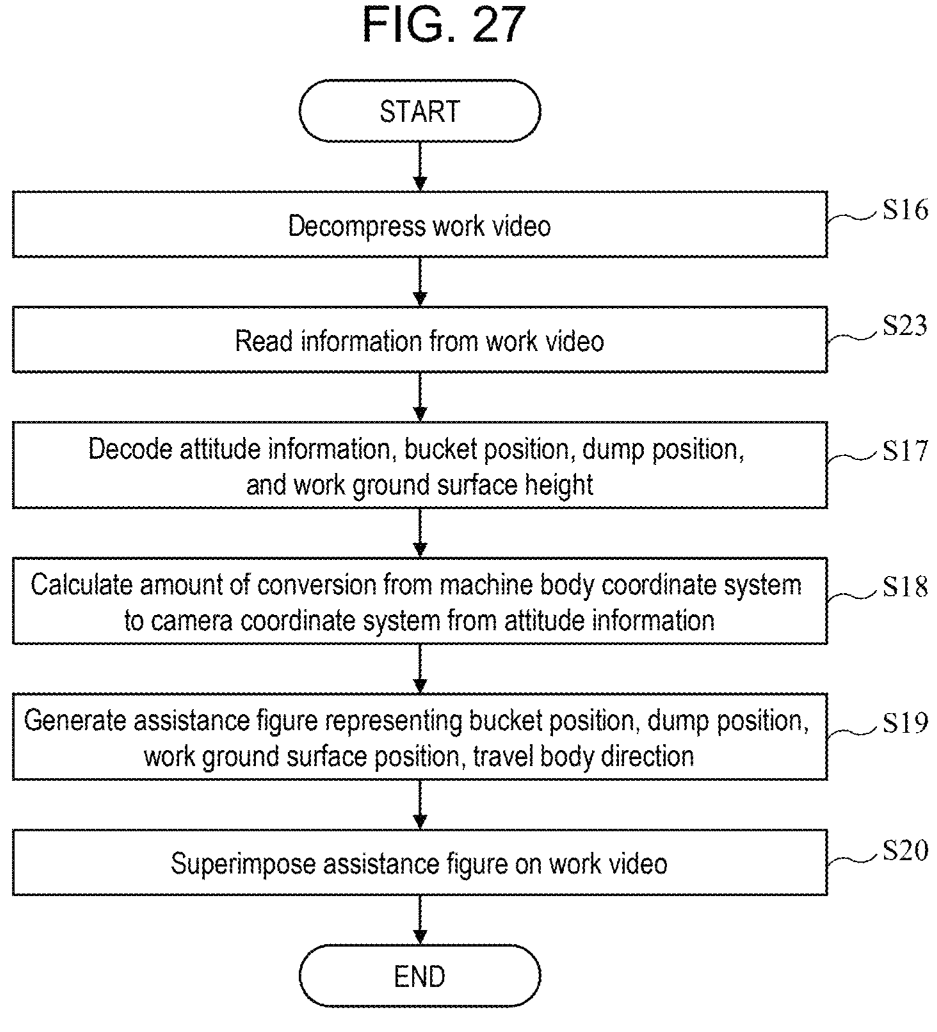
FIG. 27 is a flowchart for describing a process for generating a superimposed video including an AR image by the operation control device 305 (see FIG. 25) according to the second embodiment (variation).

FIG. 27 is a flowchart for describing a process for generating a superimposed video including an AR image by the operation control device 305 (see FIG. 25) according to the second embodiment (variation). The process of Step S23 is performed between the process of Step S16 and the process of Step S17 that are identical to those of the first embodiment (FIG. 8).

In Step S23, the information reading section 3058 reads the information embedded by the information embedding section 1034 of the sensor information processing section 103 on the basis of the pixel values of a portion of the video data decompressed in Step S16, that is, the rotation angle of the body section 102 with respect to the crawler 101 acquired by the attitude information acquisition section S3 or the time stamp information output by the time stamp issuing section 1035.

In Step S18, the coordinate system integration processing section 3054 converts the assistance information (coordinate system C2) to the information in the coordinate system C1 on the basis of the information read in Step S23, that is, the rotation angle of the body section 102 with respect to the crawler 101 acquired by the attitude information acquisition section S3 or the time stamp information output by the time stamp issuing section 1035, and the assistance information decoded in Step S17. Note that the processes in Step S16, S17, S19, and S20 are identical to those of the first embodiment (FIG. 8), and therefore description will be omitted.

<Superimposed Display Example>

Figure 28:
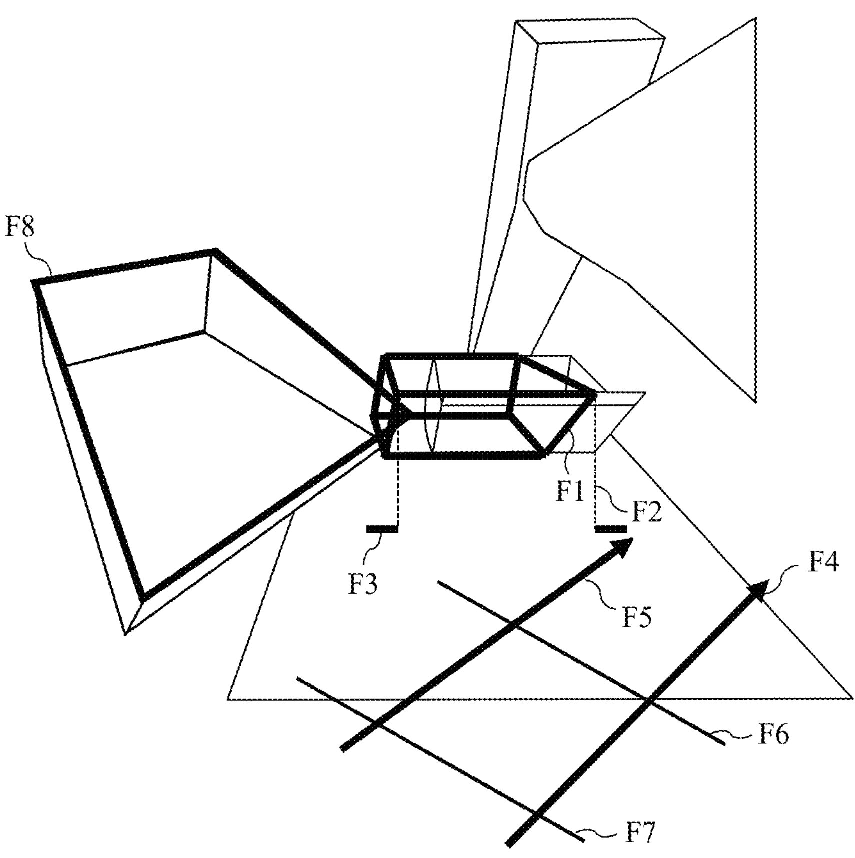
FIG. 28 is a diagram illustrating an example of a video (a surroundings captured video and a work machine front section video) and an AR image displayed superimposed thereon, displayed through the process according to the second embodiment (basic embodiment and variation).

FIG. 28 is a diagram illustrating an example of a video (a surroundings captured video and a work machine front section video) and an AR image displayed superimposed thereon, displayed through the process according to the second embodiment (basic embodiment and variation). More specifically, FIG. 28 illustrates an example of the superimposed video displayed on the display 304 in the operation of rotating the body section 102 with respect to the crawler 101 through the operation of the operating column 303 of the remote control system 300.

The AR image generated on the basis of the assistance information converted to the information in the coordinate system C1 is superimposed on the video acquired by the surroundings video acquisition section S1. Accordingly, it is possible to render the figures F3 to F8 with their display positions matching with the video of the surrounding terrain and vehicle in the video, and the figure F1 indicating the relative position of the bucket 113 with respect to the surrounding terrain and vehicle in the video and the attitude of the bucket 113.

As described above, according to the second embodiment, it is possible to eliminate the displacement between the video and the AR image and also display the video to allow the operation of the work machine 100 without being impaired by video disturbance due to a video data delay and a communication packet loss.

(3) Third Embodiment

Figure 29:
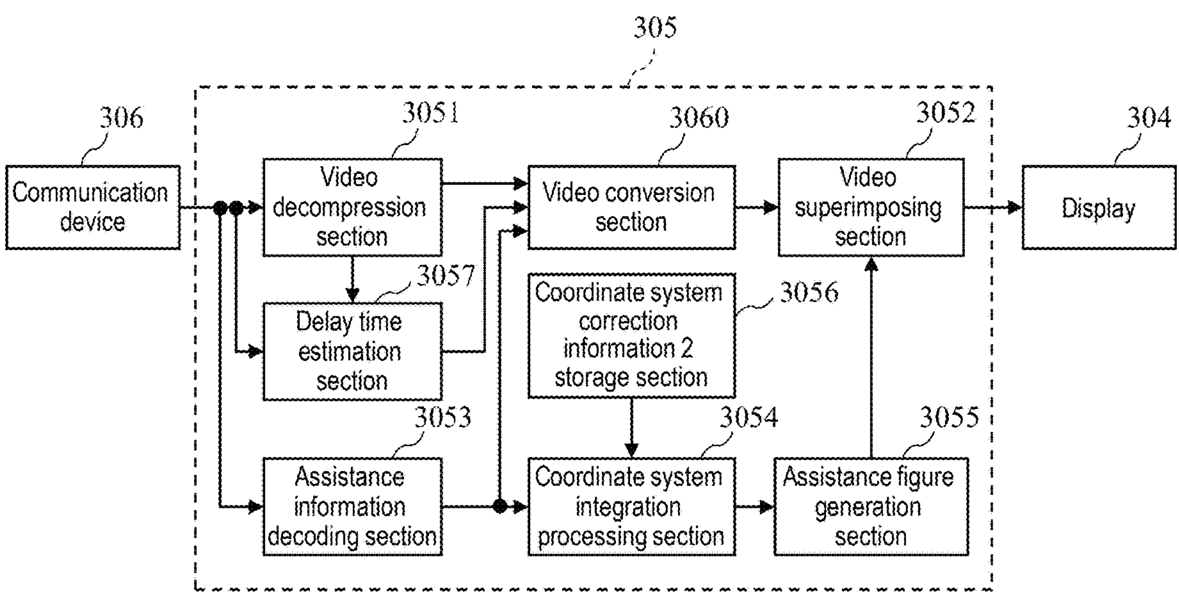
FIG. 29 is a diagram illustrating an internal configuration example 1 of the operation control device 305 according to a third embodiment.
Figure 30:
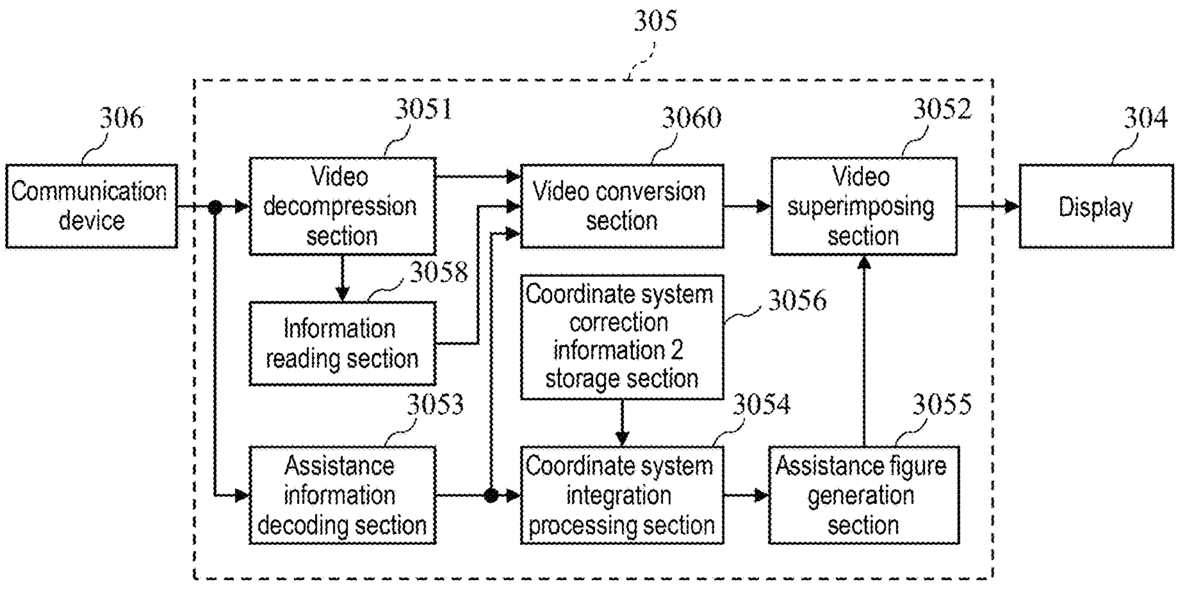
FIG. 30 is a diagram illustrating an internal configuration example 2 of the operation control device 305 according to the third embodiment.
Figure 31:
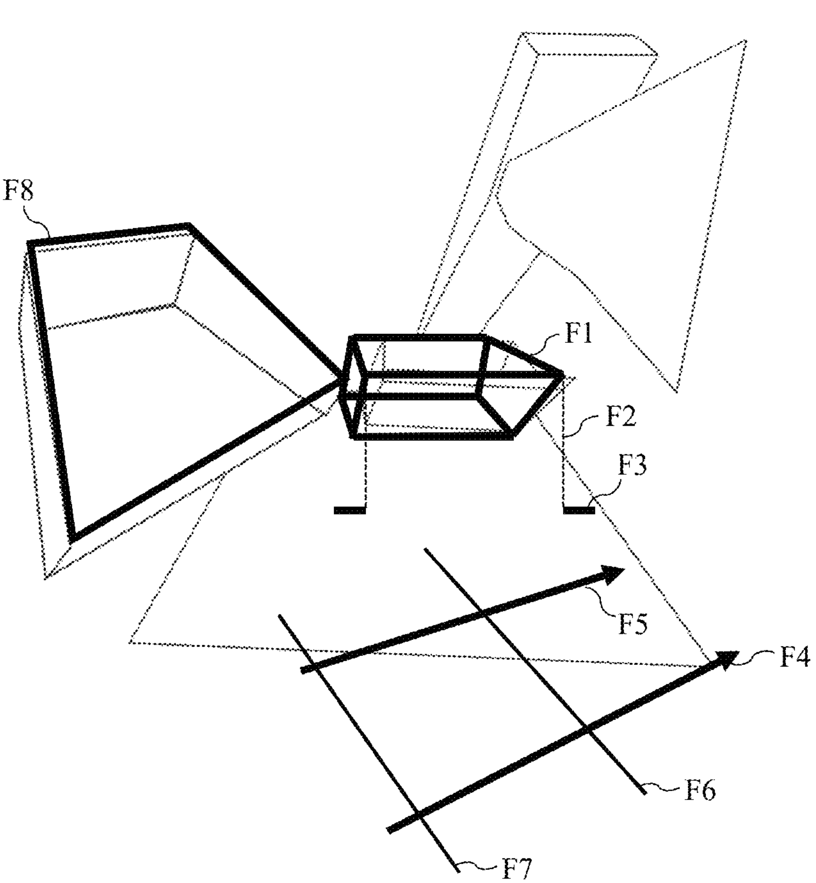
FIG. 31 is a diagram illustrating an example of a video (a surroundings captured video and a work machine front section video) and an AR image displayed superimposed thereon, displayed through the process according to the third embodiment.

With reference to FIG. 29 to FIG. 31, the work machine control system 1 according to a third embodiment will be described. Note that the overall configuration of the work machine control system 1 of the third embodiment is similar to the second embodiment, and therefore overlapping description is omitted.

In the third embodiment, an AR image is generated from the assistance information as the information in the coordinate system C2, and the surroundings video is converted to the video acquired when captured in the coordinate system C1. That is, in the second embodiment, the video is not processed but a superimposed image is generated by computing on which part of the video the AR image is to be superimposed, whereas in the third embodiment, the video is subjected to perspective transformation (for example, homography transformation: the amount of conversion is calculated from the attitude difference between the C1 and the C2) to make the video distorted and then the AR image is superimposed thereon.

<Internal Configuration Example 1 of Operation Control Device 305>

FIG. 29 is a diagram illustrating an internal configuration example 1 of the operation control device 305 according to the third embodiment. The operation control device 305 includes a video conversion section 3060 in addition to the configuration of the second embodiment (basic embodiment) (see FIG. 20). In this example, the coordinate system integration processing section 3054 converts the assistance information to the information in the coordinate system C2 (camera coordinate system). The video conversion section 3060, on the basis of the delay time output by the delay time estimation section 3057 and the assistance information decoded by the assistance information decoding section 3053, calculates the amount of conversion from the coordinate system C2 (camera coordinate system) to the coordinate system C1 (camera coordinate system) and converts the video in the coordinate system C2 to a video that can be acquired when captured in the coordinate system C1. Description of the other components will be omitted since they overlap with the second embodiment (FIG. 20).

<Internal Configuration Example 2 of Operation Control Device 305>

FIG. 30 is a diagram illustrating an internal configuration example 2 of the operation control device 305 according to the third embodiment. The operation control device 305 includes a video conversion section 3060 in addition to the configuration of the second embodiment (variation) (see FIG. 25). In this example, the coordinate system integration processing section 3054 converts the assistance information to the information in the coordinate system C2. The video conversion section 3060, on the basis of the information output by the information reading section 3058 (the rotation angle of the body section 102 with respect to the crawler 101 acquired by the attitude information acquisition section S3, or the time stamp information output by the time stamp issuing section 1035) and the assistance information decoded by the assistance information decoding section 3053, calculates the amount of conversion from the coordinate system C2 to the coordinate system C1, and converts the video in the coordinate system C2 to a video that can be acquired when captured in the coordinate system C1. Description of the other components will be omitted since they overlap with the second embodiment (FIG. 25).

<Superimposed Video Example>

FIG. 31 is a diagram illustrating an example of a video (a surroundings captured video and a work machine front section video) and an AR image displayed superimposed thereon, displayed through the process according to the third embodiment. Specifically, FIG. 31 illustrates a superimposed video example displayed on the display 304 in the operation of rotating the body section 102 with respect to the crawler 101 through the operation of the operating column 303 of the remote control system 300.

The video acquired by the surroundings video acquisition section S1 and then converted to a state where the video (distorted video) can be acquired when captured in the coordinate system C1 is superimposed with the AR image generated on the basis of the assistance information converted to the information in the coordinate system C2. Accordingly, it is possible to render the figures F3 to F8 with their display positions matching with the video of the surrounding terrain and vehicle in the video, and the figure F1 indicating the relative position of the bucket 113 with respect to the surrounding terrain and vehicle in the video and the attitude of the bucket 113.

As described above, according to the third embodiment, it is possible to eliminate the displacement between the video and the AR image and also display the video to allow the operation of the work machine 100 without being impaired by video disturbance due to a video data delay and a communication packet loss.

(4) Fourth Embodiment

Figure 32:
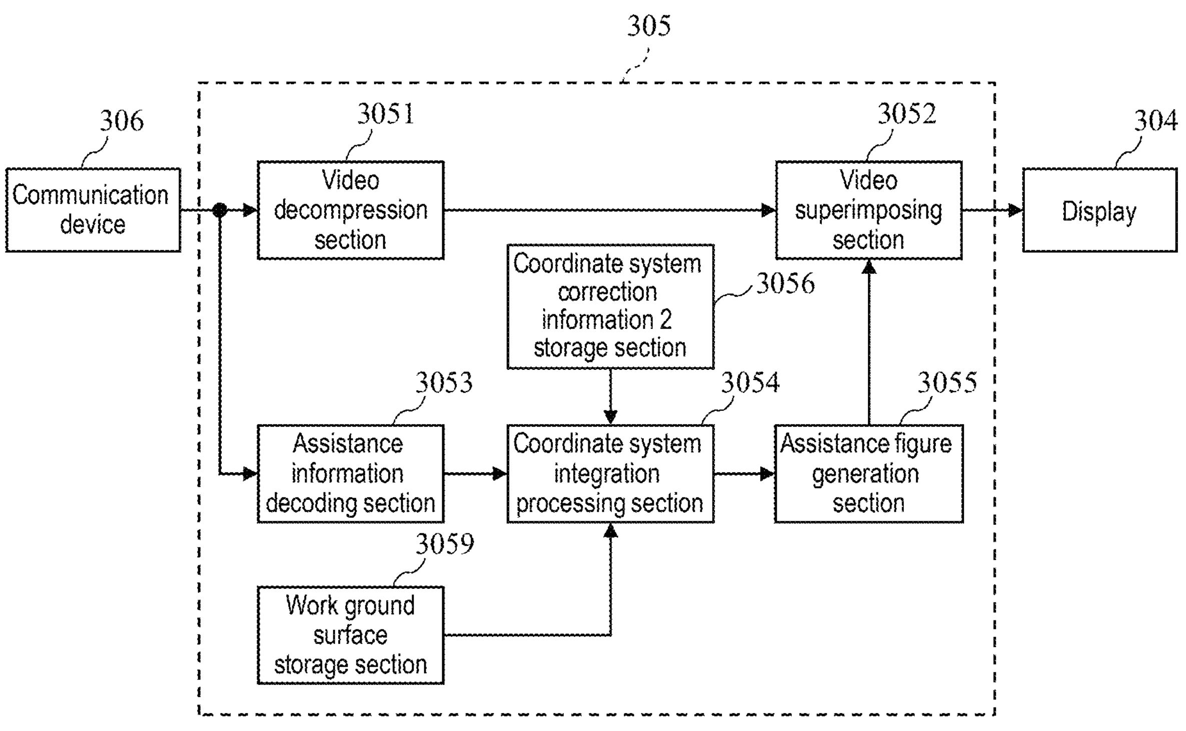
FIG. 32 is a diagram illustrating an internal configuration example of the operation control device 305 according to a fourth embodiment.
Figure 33:
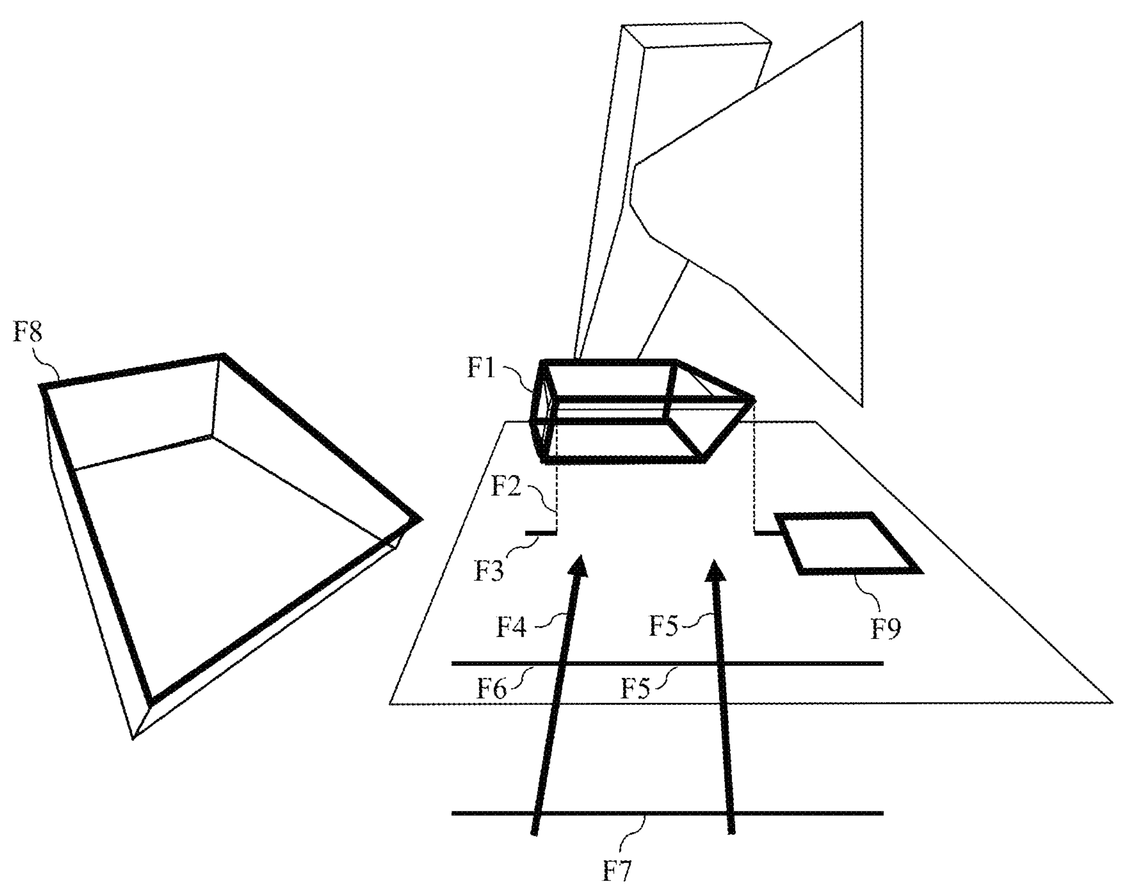
FIG. 33 is a diagram illustrating an example of a video (a surroundings captured video and a work machine front section video) and an AR image displayed superimposed thereon, displayed through the process according to the fourth embodiment.
Figure 34:
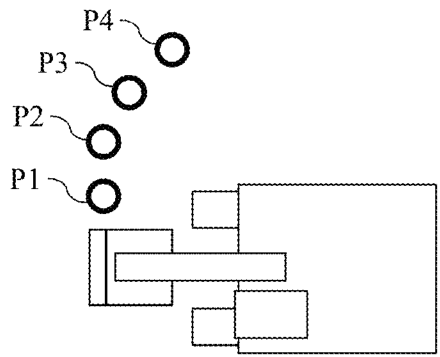
FIG. 34 is a diagram illustrating an example of a method of specifying a position of a work ground surface stored in a work ground surface storage section using a GUI according to the fourth embodiment.

With reference to FIG. 32 to FIG. 34, the work machine control system 1 according to a fourth embodiment will be described. Note that the overall configuration of the work machine control system 1 of the fourth embodiment is similar to the first embodiment, and therefore overlapping description is omitted.

The fourth embodiment differs from the first embodiment in that in the superimposed video displayed on the display 304, the figure indicating the position of the work ground surface last excavated (the latest excavated work ground surface) or the work ground surface to be excavated next is displayed superimposed. By displaying the position of the work ground, when the excavated earth or the like is bumped to the vessel 200 such as a dump truck, and then the body section 102 is rotated with respect to the crawler 101 toward the work ground surface to be excavated next, it is possible to operate the work machine 100 without being impaired by video disturbance due to a video data delay and a communication packet loss.

<Internal Configuration Example of Operation Control Device 305>

FIG. 32 is a diagram illustrating an internal configuration example of the operation control device 305 according to the fourth embodiment. The operation control device 305 includes a ground-surface-for-work storage section 3059 in addition to the configuration of the first embodiment (see FIG. 6).

The ground-surface-for-work storage section 3059 stores the position of the work ground surface to be excavated next by the work machine 100 (the position can be specified beforehand by the operator).

The coordinate system integration processing section 3054 coordinate converts the position of the ground surface for work output from the ground-surface-for-work storage section 3059, together with the assistance information.

The assistance figure generation section 3055 generates an AR image on the basis of the position of the ground surface for work output from the ground-surface-for-work storage section 3059 and the assistance information, which are converted by the coordinate system integration processing section 3054.

Note that although information about the work ground to be excavated is not necessary when the work ground last excavated is displayed, necessary information is read out from the ground-surface-for-work storage section 3059 when the work ground last excavated and the work ground to be excavated are displayed at the same time. Description of the other components will be omitted since they overlap with the first embodiment (FIG. 6).

<Superimposed Video Example>

FIG. 33 is a diagram illustrating an example of a video (a surroundings captured video and a work machine front section video) and an AR image displayed superimposed thereon, displayed through the process according to the fourth embodiment.

In FIG. 33, the AR image displayed superimposed on the video includes a figure F9 indicating the work ground last excavated and/or the work ground to be excavated, in addition to the configuration of the first embodiment (FIG. 10). The figure F9 is a figure generated on the basis of the position information on the work ground last excavated and/or the position information on the ground surface for work to be excavated output from the ground-surface-for-work storage section 3059. In this manner, by the superimposed display of the work ground last excavated and/or the ground surface for work to be excavated as an AR image, the operator can visually recognize the target position when the excavated earth or the like is bumped to the vessel 200 such as a dump truck, and then the body section 102 is rotated with respect to the crawler 101 toward the ground surface for work to be excavated next.

Note that for example, the position of the ground surface for work stored by the ground-surface-for-work storage section 3059 may be stored as a coordinate value of the ground in contact with the tip of the bucket 113 when the last excavation was performed by the work machine 100, or may be stored beforehand by specifying the position of the ground for a predetermined number of excavation plans using markers P1 to P4, on the GUI (Graphical User Interface) displaying the machine body as seen in a top view as illustrated in FIG. 34.

As described above, according to the fourth embodiment, when the body section 102 is rotated with respect to the crawler 101 toward the work ground surface to be excavated next, it is possible to operate the work machine 100 without being impaired by video disturbance due to a video data delay and a communication packet loss.

(5) Variation

While in the first to fourth embodiments, the cases have been described in which the work machine 100 is a so-called backhoe, configurations and processes similar to the first to fourth embodiments may be applied when the work machine 100 is a loading excavator where the bucket of the work machine 100 is facing forward.

<Function of Switching Display State of AR Image>

Figure 35:
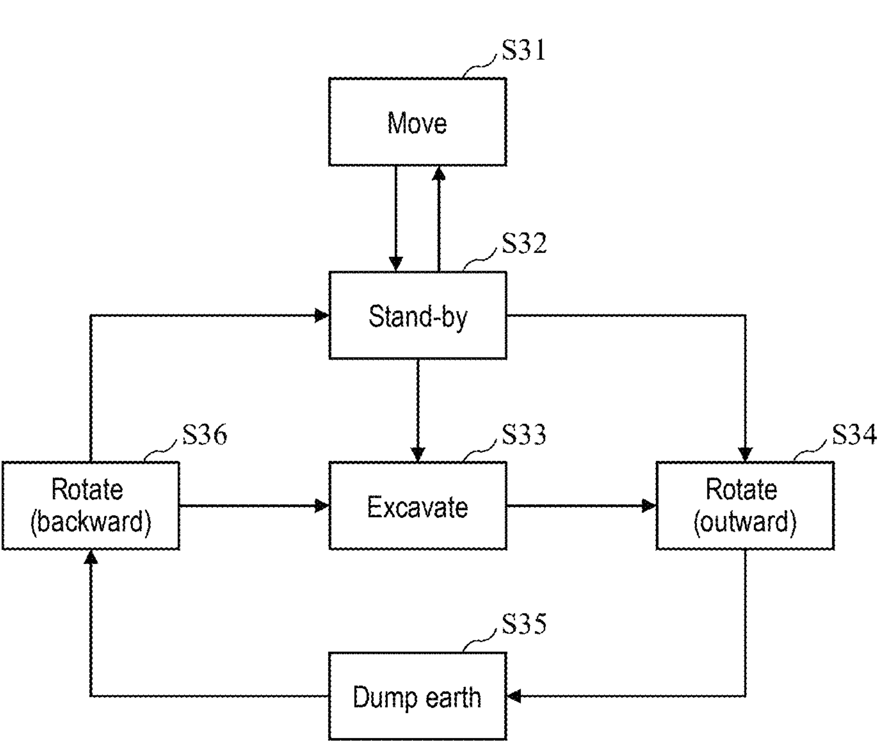
FIG. 35 is a conceptual diagram for describing the switching of the display state of an AR image in the work machine control system 1 of each embodiment.

FIG. 35 is a conceptual diagram for describing the switching of the display state of an AR image in the work machine control system 1 of each of the foregoing embodiments.

The work machine 100 moves to the excavation location (S31), stands by (S32), and then drives the bucket 113 to perform excavation (S33). After excavation, the work machine 100 rotates (outward) (S34), and dumping (S35) to the vessel 200 is performed. Once the dumping is finished, the bucket 113 again rotates (backward) (S36) to the excavation location to continue excavation (S33).

The display settings may include, during the step of excavation (S33), the figure F1 indicating the bucket 113, the figure F3 indicating the position of the ground surface for work, and the figure F2 connecting the figure F1 and the figure F3. Further, the display settings may include, during rotation (S34 and S36), the figure F4 to the figure F7 indicating the direction of the crawler 101, the figure F8 indicating the position of the vessel 200 such as a dump truck, the figure F9 indicating the work ground surface to be excavated next, for example. These display settings may be configured for each operator (a user remotely operating the loading excavator in the operation room). For example, for setting the switching of the display state, a setting value (a setting value concerning what is displayed at what stage) may be stored in a storage device, not shown, for each operator and the setting value may be read from the storage device during operation. This can achieve switching of the display of the AR image that is customized and easy to operate for each user.

Further, because the captured image may vary in brightness or contrast in accordance with the weather, the time, and the capturing direction (whether forward-lit or back-lit), it is effective to increase visibility by adjusting the brightness or contrast of the displayed superimposed AR image (reducing brightness for superimposed display when the image is dark, such as at night, and increasing brightness to make the superimposed display conspicuous when the image is bright, such as during daytime). Such brightness setting values may also be stored for each user and read during operation.

(6) Conclusion (i) In the embodiments of the present disclosure, the operation control device 305 generates an AR image (assistance figure) indicating an attitude of the work machine 100 and a position for work from assistance information received from the work machine 100, and displays on a display device in a superimposed manner, a surroundings video (video 1: see FIG. 18) acquired at a first timing in the work machine 100 and the AR image generated from the assistance information (assistance information 2: see FIG. 18) acquired at a second timing later than the first timing in the work machine 100. This allows the remote operator of the work machine 100 to know an actual work status from the AR image generated from the low volume (light) assistance information even when there is a delay in the surroundings video of the work machine 100, and thus a reduction of the work efficiency can be prevented. Here, the operation control device 305 converts the assistance information represented in a machine body coordinate system of the work machine 100 to a camera coordinate system, and generates an AR image (assistance figure) from the assistance information after coordinate conversion. Accordingly, it is possible to display the AR image in the same coordinate system as the coordinate system of the surroundings video, and to display the AR image corresponding to the actual work operation of the work machine 100 in advance of the delayed surroundings video.

(ii) The operation control device 305 generates an AR image including at least one of a figure indicating a position and an attitude of the work machine 100 (see FIG. 10, for example), a figure indicating a position of a terrain for work by the work machine 100 (see FIG. 33), a figure indicating a position of a vehicle (for example, a vessel of a dump) for work by the work machine 100 (see FIG. 10, for example), or a figure indicating an attitude of a travel body (crawler) of the work machine 100 (see FIG. 10, for example). By displaying the minimum required AR image in this manner, it is possible to assist the operation of the remote operator without confusion (displaying too much information may rather cause confusion).

(iii) The operation control device 305 displays information indicating superimposed display of the AR image based on the assistance information (assistance information 2) acquired at a later timing than the work video (video 1) on the work video, together with the superimposed image (see FIG. 15). This allows preventing erroneous operation by the remote operator when the operation is started or restarted.

(iv) In the second embodiment, the operation control device 305 changes a superimposed position and a shape of the AR image (assistance figure) (see FIG. 28) on the basis of an angular difference between a first angle formed by the travel body (crawler) of the work machine 100 and the rotation body (body section) of the work machine at a first timing and a second angle formed by the travel body and the rotation body at a second timing.

When calculating the angular difference, a delay time (first delay time) of the surroundings video and a delay time (second delay time) of the assistance information can be used. That is, the operation control device 305 compares the first delay time and the second delay time, determines the assistance information (assistance information 2: see FIG. 18) at the second timing for generating an AR image that should be superimposed on the surroundings video (video 1: see FIG. 18) at the first timing, converts the assistance information at the second timing to the coordinate system of the attitude of the work machine 100 at the first timing, and generates an AR image from the coordinate converted assistance information at the second timing.

In addition, as another example of calculating the angular difference, the angle information (information about the first angle) embedded into the surroundings video can also be used. In this case, the operation control device 305 calculates the angular difference from the information about the first angle acquired (separated) from the surroundings video data and the information about the second angle acquired from the assistance information (assistance information 2) at the second timing.

As still another example of calculating the angular difference, the time stamp (first time information corresponding to the first timing) embedded into the work image can also be used. In this case, the operation control device 305 calculates the angular difference from the angle between the travel body (crawler) and the rotation body (body section) in the assistance information at a previous time by the difference between the time stamp (first time information) acquired from the surroundings video data and second time information acquired from the assistance information, and the angle between the travel body and the rotation body in the latest assistance information (assistance information at the second timing).

(v) In the third embodiment, the operation control device 305 deforms the surroundings video (see FIG. 33) on the basis of the angular difference between the first angle formed by the travel body (crawler) of the work machine 100 and the rotation body (body section) of the work machine 100 at the first timing and the second angle formed by the travel body (crawler) and the rotation body (body section) at the second timing. Also in the third embodiment, the method of calculating the angular difference similar to the second embodiment may be employed.

(vi) In the fourth embodiment, the operation control device 305 superimposes the AR image (assistance figure) representing a planned position for work (excavation planned position) by the work machine 100 on the surroundings video on the basis of the information about the position for work (see FIG. 33). Accordingly, the remote operator can easily recognize the next position where work should be performed by the work machine 100. In addition, the position for work where the last work was performed may be displayed in an AR image.

(vii) In the variation, the operation control device 305 switches a display mode (for example, only some AR images required are displayed, or the like) of the assistance figure (AR image) in accordance with the work state of the work machine 100 (such as move, stand-by, excavate, rotate, bump earth).

(viii) The functions of the embodiments of the present disclosure may also be implemented by software program code. In this case, a storage medium with the program code recorded thereon may be provided to a system or device, and a computer (or CPU or MPU) of the system or device may read the program code stored on the storage medium. In this case, the program code per se that has been read from the storage medium will provide the functions of the embodiments described above, and the program code per se and the storage medium having the same stored thereon will constitute the present disclosure. Exemplary storage media for supplying such program code include a flexible disc, a CD-ROM, a DVD-ROM, a hard disk, an optical disk, a magneto-optical disk, a CD-R, magnetic tape, a nonvolatile memory card, and a ROM.

Also, an operating system (OS) or the like running on a computer may perform some or all of actual processes based on an instruction of the program code, and the functions of the embodiments described above may be implemented by the processes. Further, after the program code read from the storage medium has been written to a memory on a computer, a CPU or the like of the computer may perform some or all of actual processes based on an instruction of the program code, and the functions of the embodiments described above may be implemented by the processes.

Further, software program code for implementing the functions of an embodiment may be delivered via a network and stored in a storage means, such as a hard disk or a memory of a system or device, or stored in a storage medium such as a CD-RW or a CD-R. In use, the program code may be read from the storage means or the storage medium and performed by a computer (or CPU or MPU) of the system or device.

The techniques of the present disclosure are not limited to the above embodiments, and include various variations. For example, the above embodiments have been described in detail to facilitate an understanding of the techniques of the present disclosure, and are not necessarily limited to those having all of the configurations described. Further, a part of the configuration of an embodiment may be replaced with the configuration of another embodiment, and the configuration of another embodiment may be added to the configuration of a certain embodiment. Further, with respect to a part of the configuration of each embodiment, addition, deletion, and/or substitution of another configuration is also possible. Further, the above-described configurations, functions, processing sections, process means and the like may be partly or entirely designed by an integrated circuit, for example, for hardware implementation.

REFERENCE SIGNS LIST

1 Work machine control system
100 Work machine (construction machine)
101 Crawler
102 Body section
103 Sensor information processing section
104 Communication device
107 Antenna
111 Boom
112 Arm
113 Bucket
200 Vessel
300 Remote control system
301 Driver's seat
302 Operation control section
303 Input device (operating column)
304 Display
305 Operation control device
306 Communication device
1031 Video compression section
1032 Assistance information generation section 1033 Assistance information encoding section
1034 Information embedding section
1035 Time stamp issuing section
10321 Dump position calculation section
10322 Work ground surface height calculation section
10323 Bucket position/attitude calculation section
10324 Coordinate system correction information 1 storage section
3051 Video decompression section
3052 Video superimposing section
3053 Assistance information decoding section
3054 Coordinate system integration processing section
3055 Assistance figure generation section
3056 Coordinate system correction information 2 storage section
3057 Delay time estimation section
3058 Information reading section
3059 Ground-surface-for-work storage section
3060 Video conversion section
L0, L1, L2 Ground
L4 Wall surface
Lg Corresponding ground
OR Operation room
S1 Surroundings video acquisition section
S2 Three-dimensional information acquisition section
S3 Attitude information acquisition section
F1 to F17 Figure
C1, C2 Coordinate system
I1 Surroundings video
P1 to P4 Marker

The invention claimed is:

1. A remote control system for a work machine configured to remotely operate the work machine, comprising:
- a display device that receives and displays various kinds of information from the work machine via a communication device; and
- a control device that controls the display device,
- wherein the communication device receives a surroundings video of the work machine captured in the work machine, and assistance information including attitude information of the work machine and three-dimensional information around the work machine acquired in the work machine, and
- wherein the control device executes:
  - a process for generating an assistance figure indicating an attitude of the work machine and a position for work on the basis of the assistance information received by the communication device, and
  - a process for displaying on the display device in a superimposed manner, the surroundings video captured at a first timing in the work machine and received by the communication device, and the assistance figure generated from the assistance information acquired at a second timing later than the first timing in the work machine and received by the communication device.

2. The remote control system according to claim 1, wherein the control device converts the assistance information represented in a machine body coordinate system of the work machine to a camera coordinate system, and generates the assistance figure from the assistance information after coordinate conversion.

3. The remote control system according to claim 1, wherein the control device generates the assistance figure including at least one of a figure indicating a position and an attitude of the work machine, a figure indicating a position of a terrain for work by the work machine, a figure indicating a position of a vehicle for work by the work machine, or a figure indicating an attitude of a travel body of the work machine.

4. The remote control system according to claim 1, wherein the control device changes a superimposed position and a shape of the assistance figure on the basis of an angular difference between a first angle formed by a travel body of the work machine and a rotation body of the work machine at the first timing and a second angle formed by the travel body and the rotation body at the second timing.

5. The remote control system according to claim 1, wherein the control device deforms the surroundings video on the basis of an angular difference between a first angle formed by a travel body of the work machine and a rotation body of the work machine at the first timing and a second angle formed by the travel body and the rotation body at the second timing.

6. The remote control system according to claim 1, wherein the control device executes:
- a process for estimating a first delay time of the surroundings video and a second delay time of the assistance information on the basis of communication state information detected by the communication device;
- a process for determining the assistance information at the second timing for generating the assistance figure that should be superimposed on the surroundings video at the first timing on the basis of a difference between the first delay time and the second delay time;
- a process for converting the assistance information at the second timing to a coordinate system of the attitude of the work machine at the first timing, and generating coordinate converted assistance information at the second timing; and
- a process for generating the assistance figure from the coordinate converted assistance information at the second timing.

7. The remote control system according to claim 4,
- wherein data on the surroundings video includes a data portion indicating information about the first angle, and
- wherein the control device calculates the angular difference from the information about the first angle acquired from the data on the surroundings video and information about the second angle acquired from the assistance information at the second timing.

8. The remote control system according to claim 5,
- wherein data on the surroundings video includes a data portion indicating information about the first angle, and
- wherein the control device calculates the angular difference from the information about the first angle acquired from the data on the surroundings video and information about the second angle acquired from the assistance information at the second timing.

9. The remote control system according to claim 4,
- wherein data on the surroundings video includes a data portion indicating first time information corresponding to the first timing,
- wherein the assistance information includes second time information corresponding to the second timing, and
- wherein the control device calculates the angular difference on the basis of a difference between the first time information acquired from the data on the surroundings video and the second time information acquired from the assistance information.

10. The remote control system according to claim 5,
- wherein data on the surroundings video includes first time information corresponding to the first timing, wherein the assistance information includes second time information corresponding to the second timing, and wherein the control device calculates the angular difference on the basis of a difference between the first time information acquired from the data on the surroundings video and the second time information acquired from the assistance information.

11. The remote control system according to claim 1, wherein the control device generates, on the basis of information about the position for work, the assistance figure including a figure representing a planned position for work by the work machine.

12. The remote control system according to claim 1, wherein the control device switches a display mode of the assistance figure in accordance with a work state of the work machine.

13. The remote control system according to claim 1, wherein the control device displays information indicating superimposed display of the assistance figure acquired at a later timing than the surroundings video on the surroundings video, together with a superimposed image including the assistance figure and the surroundings video.

14. A remote-operated work machine system including a work machine and the remote control system according to claim 1 configured to remotely control the work machine, wherein the work machine comprises:

an imaging device that captures the surroundings video;

an attitude sensor that acquires attitude information of the work machine;

an object detection sensor that acquires three-dimensional information of the work machine; and a work machine communication device that communicates with the remote control system, and transmits the surroundings video and the assistance information including the attitude information and the three-dimensional information.

15. A work information display control method of displaying work information received from a work machine on a screen, comprising:

acquiring, by a control device that controls operation of the work machine, a surroundings video of the work machine captured in the work machine, and assistance information including attitude information of the work machine and three-dimensional information around the work machine;

generating, by the control device, an assistance figure indicating an attitude of the work machine and a position for work from the assistance information; and displaying, by the control device, on a display device in a superimposed manner, the surroundings video captured at a first timing in the work machine, and the assistance figure generated from the assistance information acquired at a second timing later than the first timing in the work machine.

* * * * *